US006972756B1

(12) United States Patent
Yamamoto

(10) Patent No.: US 6,972,756 B1
(45) Date of Patent: Dec. 6, 2005

(54) IMAGE GENERATING DEVICE

(75) Inventor: Makoto Yamamoto, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/555,117

(22) PCT Filed: Nov. 25, 1998

(86) PCT No.: PCT/JP98/05304

§ 371 (c)(1),
(2), (4) Date: May 25, 2000

(87) PCT Pub. No.: WO99/27498

PCT Pub. Date: Jun. 3, 1999

(30) Foreign Application Priority Data

Nov. 25, 1997 (JP) .................................. 9-323280

(51) Int. Cl.$^7$ ............................................. G06T 15/00
(52) U.S. Cl. ........................... 345/419; 463/2; 463/32
(58) Field of Search ............................... 345/165, 419; 463/1, 2, 30–34; 273/434

(56) References Cited

U.S. PATENT DOCUMENTS

| 5,358,259 | A | * | 10/1994 | Best ............................ 273/434 |
| 5,853,324 | A | * | 12/1998 | Kami et al. .................... 463/2 |
| 5,938,530 | A | * | 8/1999 | Watanabe ....................... 463/2 |
| 6,139,433 | A | * | 10/2000 | Miyamoto et al. ............. 463/32 |
| 6,155,923 | A | * | 12/2000 | Stephens et al. ............... 463/1 |
| 6,155,926 | A | * | 12/2000 | Miyamoto et al. ............. 463/32 |
| 6,217,446 | B1 | * | 4/2001 | Sanbongi et al. ........... 345/419 |

FOREIGN PATENT DOCUMENTS

| EP | 0 809 214 A1 | 11/1997 |
| JP | 4-340669 | 11/1992 |
| JP | 8-227463 | 9/1996 |
| JP | 8-280933 | 10/1996 |
| JP | 9-50536 | 2/1997 |
| JP | 9-50541 | 2/1997 |

OTHER PUBLICATIONS

European Search Report dated Apr. 2, 2001.

* cited by examiner

Primary Examiner—Sumati Lefkowitz
Assistant Examiner—Srilakshmi K. Kumar
(74) Attorney, Agent, or Firm—Finnegan, Henderson, Farabow, Garrett & Dunner, L.L.P.

(57) ABSTRACT

An image in which an enemy moving in the game space of a gun game is acquired from a movable camera viewpoint in the space is generated. A control means (steps S24 and S27–S31) which controls the movement of the camera viewpoint by using the positional relation between a viewed point determined in relation to the enemy and the line of sight of the present camera viewpoint for every image frame is provided. The means judges the specific moving state of the camera viewpoint, moves the camera viewpoint while the line of sight is fixed, calculates the angle between the direction from the camera viewpoint toward the viewed point and the direction of the line of sight of the camera viewpoint before it is moved, and turns the camera viewpoint to the viewed point in accordance with the calculated angle.

60 Claims, 19 Drawing Sheets

GAME AI CONCEPTUAL DIAGRAM

LINEAR INTERPOLATION
θ : ROTATION ANGLE

FUNCTION CURVE OF LINEAR INTERPOLATION

TERTIARY CURVILINEAR INTERPOLATION
θ : ROTATION ANGLE

FUNCTION CURVE OF
TERTIARY FUNCTIONAL INTERPOLATION (a)

(b)

(c)

(d)

(a)

(b)

IMAGE GENERATING DEVICE

TECHNICAL FIELD

The present invention relates to an image generating device. Particularly, this invention relates to an image generating device suitable for gun shooting games and the like, wherein essential is the movement control of a movable object to be moved within a virtual three-dimensional space and a camera viewpoint (i.e., monitor image) within such space for making the image follow this movable object.

BACKGROUND ART

Pursuant to the development of computer graphics technology in recent years, simulation devices and game devices have become widely popular for both business and domestic use. As one type of game device, there is a gun shooting game (gun game) for shooting down targets (enemies) moving in a virtual space, and has gained deep-rooted popularity.

This game device is usually equipped with a gun unit, CPU for graphics processing, monitor, and so on. When a player operates the trigger of the gun unit upon aiming at the enemy appearing on the monitor screen, the CPU detects the position on the monitor screen of the light signal fired from the gun unit and performs image processing inclusive of processing for defeating the enemy based on this position data.

As one representative gun shooting game heretofore, there is "Virtua Cop (trademark)" manufactured by SEGA ENTERPRISES, LTD. This is a gun game where players compete for scores by using a gun unit and shooting down the enemies appearing in the virtual three-dimensional space (game space) on the monitor screen. In this game, the enemies appear at predetermined positions in a predetermined timing on the monitor screen. When the player aims the gun unit at the enemy, the viewpoint on the monitor screen approaches the enemy and such enemy is enlarged and displayed on the monitor screen. Movements of the enemy are controlled by the CPU of the device pursuant to prescribed programs and, as necessary, are set to make an attack toward the player viewing the monitor screen.

Nevertheless, as a result of the various studies conducted by the present inventors regarding conventional gun shooting games, they have discovered that recent demands of extremely real and ambient games, which also heighten the interest thereof, have not been fulfilled heretofore in a sufficient manner.

(1) For example, in conventional gun shooting games, there is a problem when the enemy makes an attack toward the player. When an enemy fires a bullet pursuant to the CPU control, the player is in a "dangerous situation" (situation of being hunted by the enemy) in the game. Nevertheless, conventionally, as the front area of the enemy is smallest when such enemy is hunting the player, such player had difficulty recognizing that he/she is facing a "dangerous situation" merely by the image of the enemy. Therefore, the player would perceive the feeling of being suddenly defeated by the enemy, and unnaturalness in comparison to a game in the real world.

In order to avoid the above, there are conventional devices which employ a method of displaying a mark on the monitor screen to make the player recognize that he/she is in a "dangerous situation." This, however, is too artificial and is unable to provide a natural game feeling.

(2) Secondly, it was not possible to move the camera viewpoint (i.e., viewpoint of the monitor screen viewed by the player) properly so as to follow the enemy without losing sight of the enemy. For example, when the moving speed of the enemy is fast, or when there is a plurality of enemies, as the rotation of conventional camera viewpoints was too abrupt, there was a problem in that the player would lose sight of the enemy on the screen.

(3) Moreover, in conventional gun shooting games, it is necessary to have a rule base corresponding to all situations in order to control the behaviors of people. Therefore, for instance, in order not to make a character behave unnaturally such as "calmly counterattacking immediately after having been scared until then", it was necessary to prepare rules for the connection between such behavior (result) and cause and to priorly store the same as a database. Accordingly, time and labor were required for the development of such database, and there was a problem in that the development costs would rise. Further, as it is stored as a database, there was a problem in that it is difficult to discover errors in the stored information. In addition, the memory capacity for the database had to be increased.

(4) Moreover, structures other than the movable object, such as walls and obstacles, were not moved in conventional gun shooting games. Therefore, collision (contact) judgment between a bullet and such structures was made on the premise that the structure is always located at a fixed position on the game space. Although this will provide a precise image, this is insufficient in terms of producing powerfulness upon a collision or dynamic game developments from the perspective of improving the amusement of the game.

(5) Moreover, in conventional gun shooting games, there were various problems in that the movement of parts structuring the character or the movement between the motions of the characters lacking reality. For example, conventionally, upon being hit by a bullet, the mere motion of collapsing was made. But actually, desired is a presentation of reactions upon being hit by a bullet or expressions such as "I'm hit, but not dead yet!" and so on. Further, there was also dissatisfaction in terms of reducing the operational load of character movements between one motion and the next motion as well as making such movements smooth.

SUMMARY OF THE INVENTION

The present invention was devised in view of the aforementioned problems encountered by the conventional art, and the main object thereof is to provide an image generating device suitable for gun shooting games and the like, having abundant realism and ambience than conventionally, and which does not suffer the operational processing in comparison to conventional devices.

Further, another object of the present invention is to increase the ambience and considerably enhance the interest in the game feeling and game amusement by making the player recognize the "dangerous situation" with accuracy.

Moreover, still another object of the present invention is to provide a game device suitable for gun shooting games and the like and which substantially enhances the interest in the game feeling and game amusement by making the camera viewpoint move properly with the movement of the enemy without losing sight of such enemy.

Moreover, a further object of the present invention is to provide a game device suitable for gun shooting games and the like and which makes a character have elements of "behaviors" resulting from "emotions" upon controlling the action of the character, and which is abundant in realism and ambience without increasing the operational load than conventionally.

Still a further object of the present invention is to provide a game device capable of making the collision with structures other than the movable object, such as walls and obstacles, to be impressive, realizing dynamic game developments, increasing ambience, and considerably enhancing the game feeling and interest in the game.

Yet another object of the present invention is to provide a game device suitable for gun shooting games and the like, capable of improving the realism in the movement of parts structuring the character or the movement between the motions of the characters, increasing realism and ambience, and which does not suffer the operational processing in comparison to conventional devices.

In order to achieve the aforementioned objects, the image generating device according to the present invention is structured as follows.

The first structure is an image generating device for generating images capturing a movable object moving within a virtual three-dimensional space from a movable viewpoint in the virtual three-dimensional space, the image generating device comprising: movement means for controlling the movement of the camera viewpoint upon utilizing the position relationship between the observable point set in relation to the movable body and the line of sight from the current camera viewpoint. Preferably, the virtual three-dimensional space is a game space, and the movable body is an enemy in a gun shooting game enacting in the game space. More preferably, the image generating device further comprises: display means for displaying the game space on a screen; a gun unit capable of producing signals toward the screen by the player manipulating the trigger; a sensor for detecting the arrival position of the signals on the screen of the display means; and game implementing means for implementing a gun shooting game between the enemy and player based on the arrival position.

For example, the position of the observable point is at a different position than that of the movable body, and the image generating device further comprises: observable point moving means for moving this observable point toward the movable body for each display of one frame of the image. The observable point moving means is means for moving, for each display of one frame of the image and along the straight line distance connecting the observable point and the position of the movable object, the observable point toward the movable object in prescribed distances of the direct distance thereof. The observable point moving means comprises: means for operating the open angle between the current line of sight extending from the camera viewpoint and the line extending from the camera viewpoint through the observable point; means for operating a prescribed rotational angle from such open angle; and means for rotating, for each display of one frame of the image, the camera viewpoint toward the observable point side at the rotational angle.

Preferably, the moving means comprises: judging means for judging the occurrence of specific circumstances of the relative position relationship between the camera viewpoint, which changes in accordance with manipulations of the player, and the observable point; and viewpoint movement control means for controlling the position of the camera viewpoint so as to continuously capture the position of the observable point when it is judged as a specific circumstance by the judging means. For example, the viewpoint movement control means is means for performing position control pursuant to movement motion for moving the camera viewpoint, and rotational motion in accordance with the angle formed by the direction toward the observable point from the position of the camera viewpoint after the movement and the line-of-sight direction of the camera viewpoint before the movement. For instance, the viewpoint movement control means includes viewpoint rotation means for rotating the camera viewpoint toward the observable point side in accordance with the angle. As one example, the viewpoint rotation means is means for rotating the camera viewpoint toward the observable point side based on an angle in which the angle is increased/decreased a prescribed value. Thereby, the observable point may be moved slightly on the screen, and it is possible to actively provide to the player a sense of movement and circling around. Further provided is avoidance manipulation means for a player to manipulate the character, which is a simulation of such player on a screen, to avoid the bullet fired from the enemy; wherein the judging means is means for judging whether the avoidance manipulation means is in a manipulative state or not.

The second structure of the present invention is an image generating device for displaying on a display images for a player to play a gun shooting game with an enemy character existing in a virtual game space, the image generating device comprising: image processing means for performing image display suggesting in advance to the player an attack made by the enemy character to the player. Preferably, the image display is a display of a bullet fired from the enemy character and flying toward the player in the actual space. The display of the bullet is, for example, a display of the bullet flying in an arc.

The third structure of the present invention is an image generating device for displaying on a display images for a player to play a gun shooting game with an enemy character existing in a virtual game space, the image generating device comprising: AI processing means for executing AI processing incorporating emotions of the character influenced between circumstances, evaluation/determination, and factors of behaviors in the game. For example, the factors of emotions are represented by emotional elements of fear and anger in relation to the game. Preferably, the AI processing means includes means for performing processing to reflect the results of behavior based on the factors of behaviors to the factors of emotions.

The fourth structure of the present invention is an image generating device for generating images by representing a movable object simulating a person and moving inside a virtual three-dimensional space as a plurality of parts connected via connection points, the image generating device comprising: first specifying means for specifying a subpart on the terminal side and a main part on the central side with respect to two adjacent parts among the plurality of parts; first operating means for operating the impulse of the subpart motion communicated to the main part under the presumption that the connection point of the subpart to the main part is a fixed point; first repeating means for repeating, in a recurring manner, the movements of the first specifying means and the first operating means from the terminal side of the movable object to the central side thereof; second specifying means for specifying a main part on the central side and a subpart on the terminal side with respect to two adjacent parts among the plurality of parts; second operating means for operating the impulse of the main part motion communicated to the subpart; and second repeating means for repeating, in a recurring manner, the movements of the second specifying means and the second operating means from the central side of the movable object to the terminal side thereof.

In this fourth structure, at least one of the first and second operating means is means for executing seasoning-like operational processing upon simulating the person. For example, the seasoning-like operational processing includes at least one of, or a plurality of operations among: operation for applying a reverse moment, which is caused pursuant to restrictions of the movement of joints of the person, to the parts; operation for reflecting the external force inflicted on the person to the parts; operation for correcting the unnaturalness of the position of the parts caused pursuant to differences in calculations; operation for applying the internal force moment caused by physical characteristics of the person to the parts; and control operation of the rotation or movement speed of the parts for reflecting expressions caused by the mentality of the person to the parts.

The fifth structure of the present invention is an image generating device for generating image data which interpolates the motion between two types of motions of the movable object moving within a virtual three-dimensional space; comprising: operating means for discretely operating the function curve of the motion between the two types of motions pursuant to the current rotational angle, target rotational angle, and number of frames required to reach the target rotational angle; and interpolation means for performing motion interpolation based on the operational results of the operating means.

The sixth structure of the present invention is an image generating device for generating images requiring the collision judgment between a movable object moving within a virtual three-dimensional space and a structural object arranged in the space, comprising collision judgment means for judging the collision with the movable object while moving the structural object. Preferably, the collision judgment means is means for judging the collision while moving the structural object in either parallel movement or rotational movement.

The present invention is also a storage medium storing a program for executing the respective means of the image generating device. A storage medium is any medium having stored therein information (mainly digital data and programs) by some physical means, and is capable of making processing devices such as computers and dedicated processors execute prescribed functions. In other words, any means capable of downloading a program onto a computer and executing prescribed functions will suffice.

For example, this would include a flexible disk, hard disk, magnetic tape, magnetic disk, CD, CD-ROM, DVD-RAM, DVD-ROM, DVD-R, PD, MD, DCC, ROM cartridge, RAM memory card with battery backup, flash memory cartridge, non-volatile RAM cartridge, and so forth.

Cases of receiving data transfer from a host computer via wire- or radio-communication circuits (public circuits, data-dedicated circuits, satellite circuits, etc.) shall also be included in the above. The so-called Internet is also included in the storage medium described above.

BEST MODE FOR CARRYING OUT THE INVENTION

One embodiment of the present invention is now explained with reference to the drawings.

Figure 1:
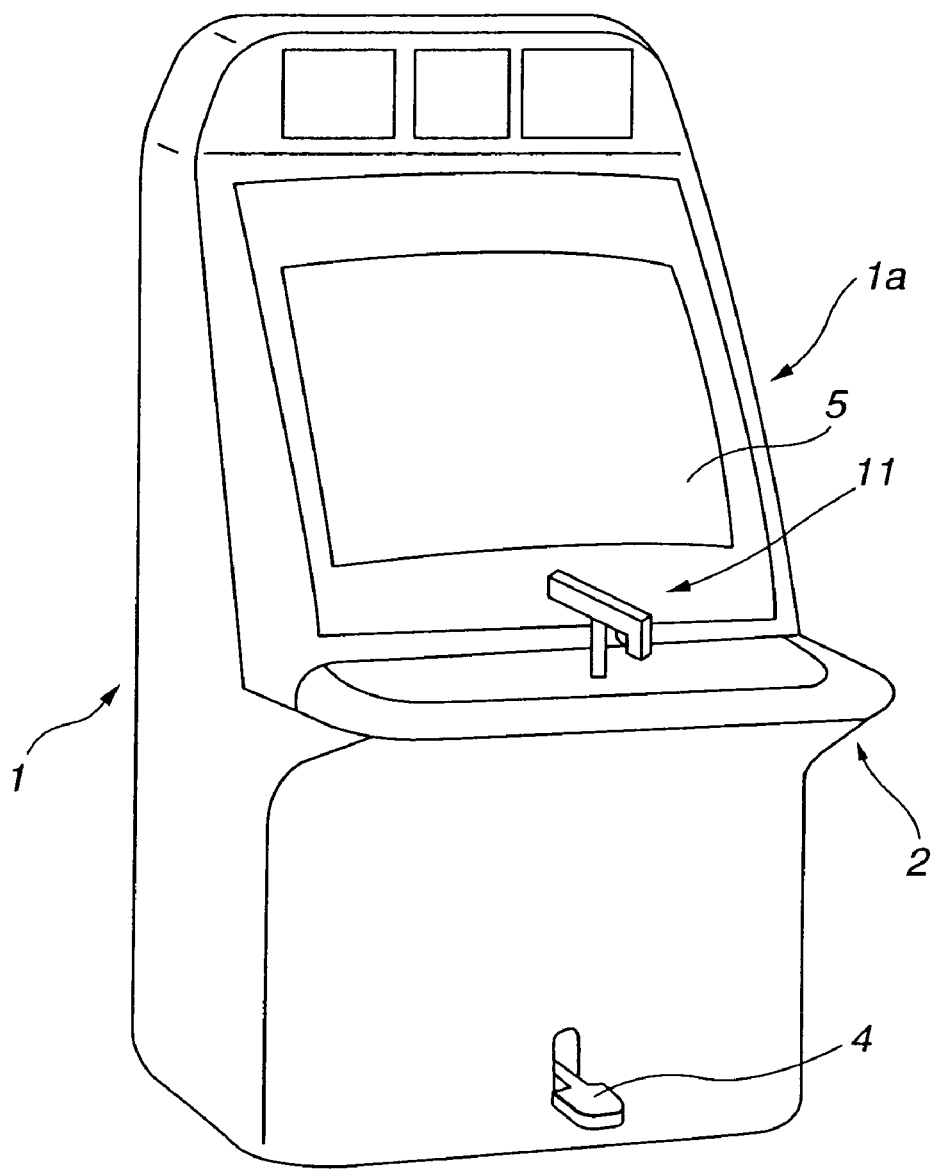
FIG. 1 is an overall perspective view of the game device as the image generating device according to one embodiment of the present invention.

FIG. 1 shows an example of the appearance of the game device as the image generating device of the present invention. This game device executes a gun shooting game for shooting down targets (enemies) moving in a virtual game space.

As shown in FIG. 1, the game device comprises a device main body 1. The device main body 1 has an overall box-like shape and comprises a display 1a at the front face thereof. A speaker 14 described later is mounted on the side of the display 1a.

On the front face of the device main body 1 is provided a manipulation panel 2 positioned to be below the display 1a. A gun unit 11 comprising a trigger to be manipulated by a player is mounted on the manipulation panel 2. By the player pulling (manipulating) the trigger of the gun unit 11, light signals from the gun unit 11 are emitted toward the display 1a. Further, at the lower part of the device main body 1, provided is a pedal sensor 4 as avoidance manipulation means to be manipulated by the player. This pedal sensor 4 is used for moving the character on the display screen simulating the player himself/herself in order to avoid the bullet, and so on. The detection information of this pedal sensor 4 is sent to the game processing board explained later. A manual switch or manual lever may be used instead of this pedal sensor.

A position sensor 5 for detecting the entering position of the light signal from the gun unit 11 is provided on the display screen of the display 1a. The position sensor 5 forms a part of the gun unit 11. The detected information of this position sensor 5 is sent to the game processing board explained later.

A game processing board is internally provided to the device main body 1. Devices such as a display 1a, pedal sensor 4, position sensor 5, output devices 12 such as indicators, speaker 14, etc. are electrically connected to this game processing board. The player plays a gun shooting game by manipulating the gun unit 11 while viewing the game screen displayed on the display 1a.

Figure 2:
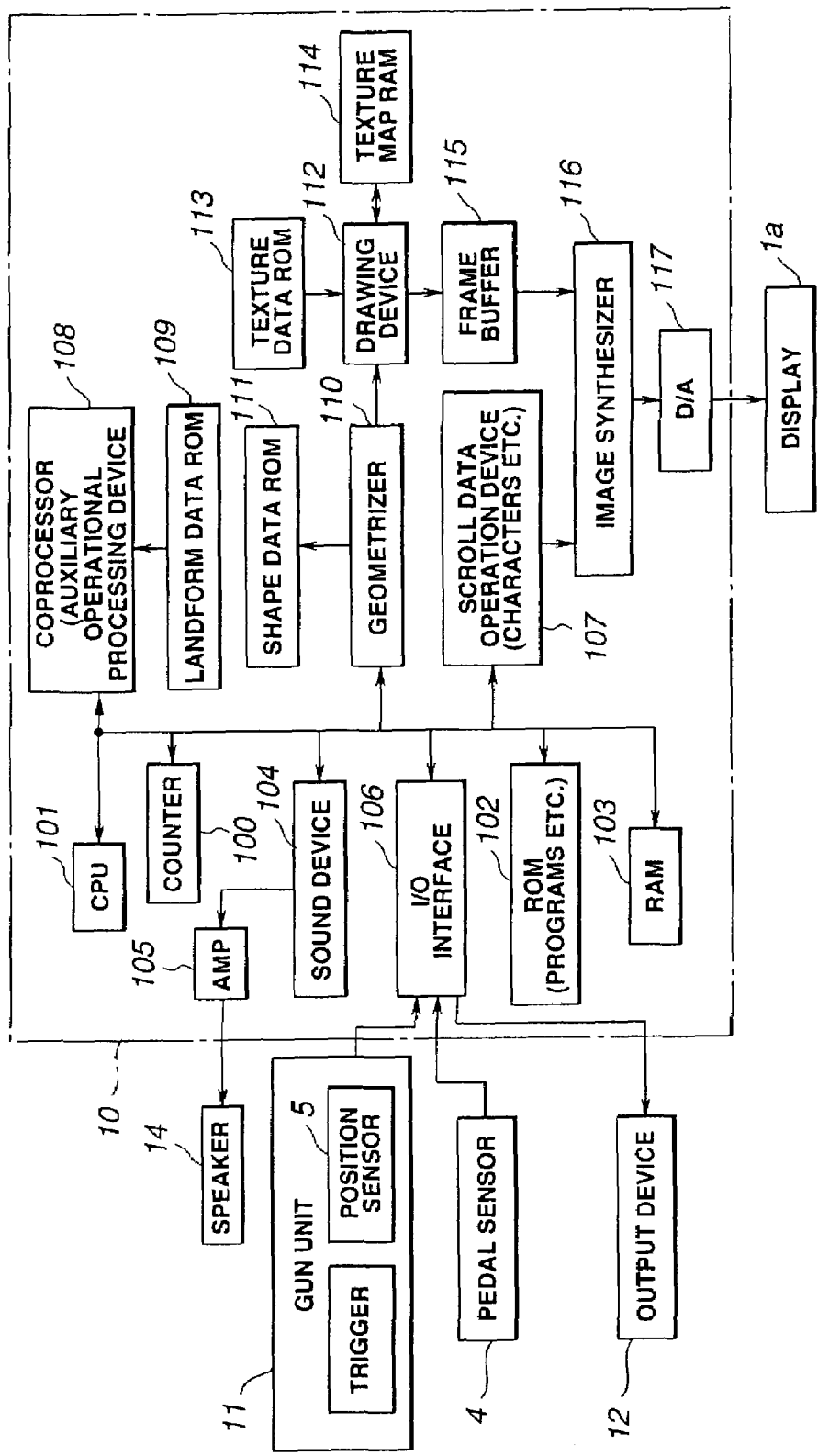
FIG. 2 is an electrical block diagram of the game processing board.

FIG. 2 shows a block diagram of the game device according to the present embodiment. As shown in FIG. 2, the game processing board 10 comprises a counter 100, CPU (central processing unit) 101, ROM 102, RAM 103, sound device 104, I/O interface 106, scroll data operation device 107, coprocessor (auxiliary operational processing device) 108, diagram data ROM 109, geometrizer 110, shape data ROM 111, drawing device 112, texture data ROM 113, texture map RAM 114, frame buffer 115, image synthesizing device 116, and D/A converter 117.

Among the above, the CPU 101 is connected, via a bus line, to the ROM 102 storing prescribed programs or image processing programs, RAM 103 storing operational data, sound device 104, I/O interface 106, scroll data operation device 107, coprocessor 108, and geometrizer 110. The RAM 103 functions as a buffer, and is used to write various commands (display of objects, etc.) to the geometrizer and to write necessary data upon various operations.

The I/O interface 106 is connected to the pedal sensor 4 and position sensor 5, and detection signals of both sensors are written into the CPU 101 as digital values. The sound device 104 is connected to the speaker 14 via a power amplifier 105. Thereby, sound signals generated by the sound device 104 are power amplified and output as sounds from the speaker 14.

Based on the program built in the ROM 102, the CPU 101 reads manipulation signals from the gun unit 11 and landform data from the landform data ROM 109, and shape data (three dimensional data, e.g., "characters such as enemies" and "backgrounds such as landforms, sky, and various structural buildings") from the shape data ROM 111, and performs operations including the behavior calculation (simulation) of characters and calculation of special effects.

Behavior calculation is for simulating the movement of enemies in the virtual three-dimensional space (game space). In order to implement the above, after the enemy polygon coordinate values in the virtual three-dimensional space are determined, a conversion matrix for converting these coordinate values into a two-dimensional visual field coordinate system and shape data (polygon data) are designated by the geometrizer 110. The landform data ROM 109 is connected to the coprocessor 108 and predetermined landform data is delivered to the coprocessor 108 and CPU 101. The coprocessor 108 mainly undertakes the operation of floating decimal points. Thus, as various judgments are executed with the coprocessor 108 and the judgment results are provided to the CPU 101, the operational load of the CPU is lightened.

The geometrizer 110 is connected to the shape data ROM 111 and drawing device 112. As mentioned above, priorly stored in the shape data ROM 111 is shape data formed of a plurality of polygons (three-dimensional data such as characters, landforms, backgrounds, etc. formed of the respective apexes). This shape data is delivered to the geometrizer 110. The geometrizer 110 conducts perspective conversion to the designated shape data with the conversion matrix sent from the CPU 101, and obtains data converted from the coordinate system in the three-dimensional space into a visual field coordinate system.

The drawing device 112 affixes texture to the shape data of the converted visual field coordinate system, and outputs this to the frame buffer 115. In order to affix this texture, the drawing device 112 is connected to the texture data ROM 113 and texture map RAM 114 as well as to the frame buffer 115.

Here, polygon data shall mean coordinate data groups relative to the respective apexes or of absolute coordinates of polygons (polygonal: mainly triangles and quadrilaterals) composed of a plurality of apexes. Stored in the landform data ROM 109 is polygon data set to be relatively rough but sufficient in implementing prescribed judgments (collision judgments, etc.). Meanwhile, stored in the shape data ROM 111 is polygon data set to be more precise in relation to the shape structuring screens such as enemies and backgrounds.

The scroll data operation device 107 calculates data (stored in the ROM 102) of scroll screens such as characters. This operation device 107 and frame buffer 115 arrive at the display 1a via the image synthesizing device 116 and D/A converter 117. Thereby, polygon screens (simulation results) of enemies and landforms (backgrounds) temporarily stored in the frame buffer 115 and scroll screens such as character information and so on are synthesized in accordance with the designated priority, and a final frame image data is generated for each fixed timing. This frame image data is converted into analogue signals at the D/A converter 117 and sent to the display 1a, and displayed as a game screen in real time.

Figure 3:
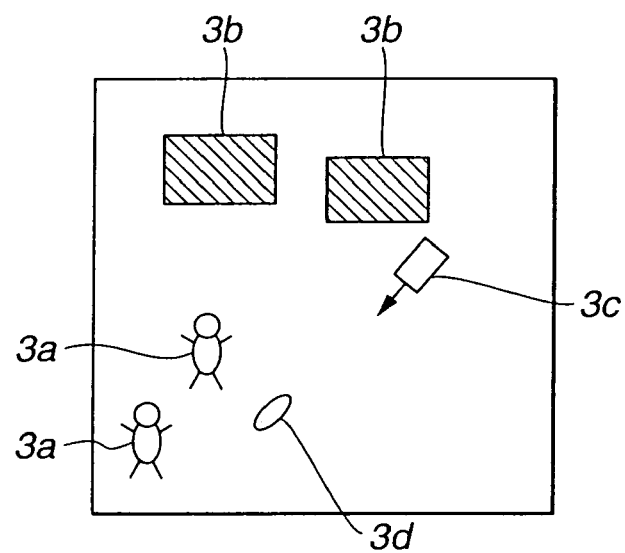
FIG. 3 is a conceptual diagram showing an example of the game space.
Figure 4:
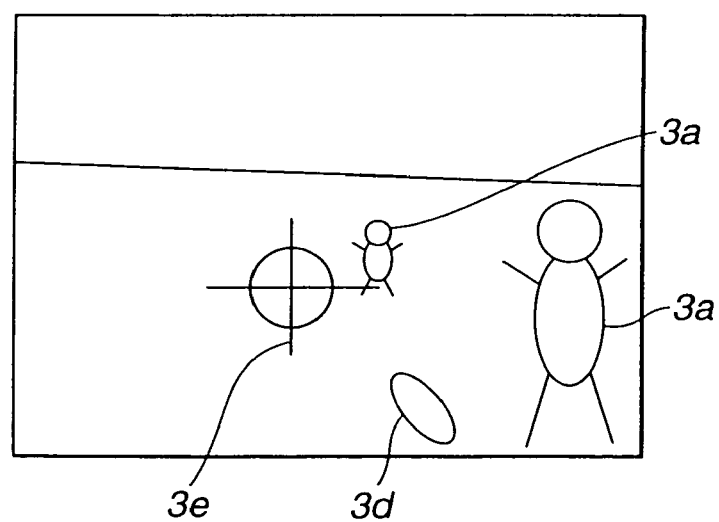
FIG. 4 is a diagram showing a typical example of a game screen to be displayed on the display.

This game device conducts a gun shooting game by the operational processing described later mainly with the CPU 101. FIG. 3 shows a conceptual diagram of a game space provided by this game device. FIG. 4 shows a typical example of a game screen of the display 1a.

In FIG. 3, the game space is formed of a virtual three-dimensional space, and includes an enemy (movable body) 3a, obstacle (structural object) 3b, camera viewpoint 3c, bullet (movable body) 3d, and so on. The enemy 3a is a target which the player hunts and, pursuant to the CPU control on the device side, autonomously moves while avoiding the bullet fired, via the gun unit 11, by the player simulated at the position of the camera viewpoint, and makes an attack (fires bullets) to the player simulated at the position of the camera viewpoint. The camera viewpoint 3a is the viewpoint of the player, and, for example, is provided on a flying object such as a helicopter. This viewpoint moves in the game space while following the movement of the enemy. Further, a plurality of enemies 3a exist in the game space. The obstacle 3b may be structures such as a container, building, or wall and is provided to give variation to the game. The enemy 3a and camera viewpoint 3c move in the game space while avoiding the collision with such obstacle 3b.

In FIG. 4, the game screen corresponds to the composition viewed from the camera viewpoint 3c of FIG. 3. A sight 3e is displayed on the game screen. This sight 3e moves pursuant to the player changing the direction of the gun unit 11. When the sight 3e overlaps with the enemy 3a and the player pulls the trigger of the gun unit 11, a bullet 3d is fired toward the enemy 3a.

(Working)

[Main Routine Processing]

Figure 5:
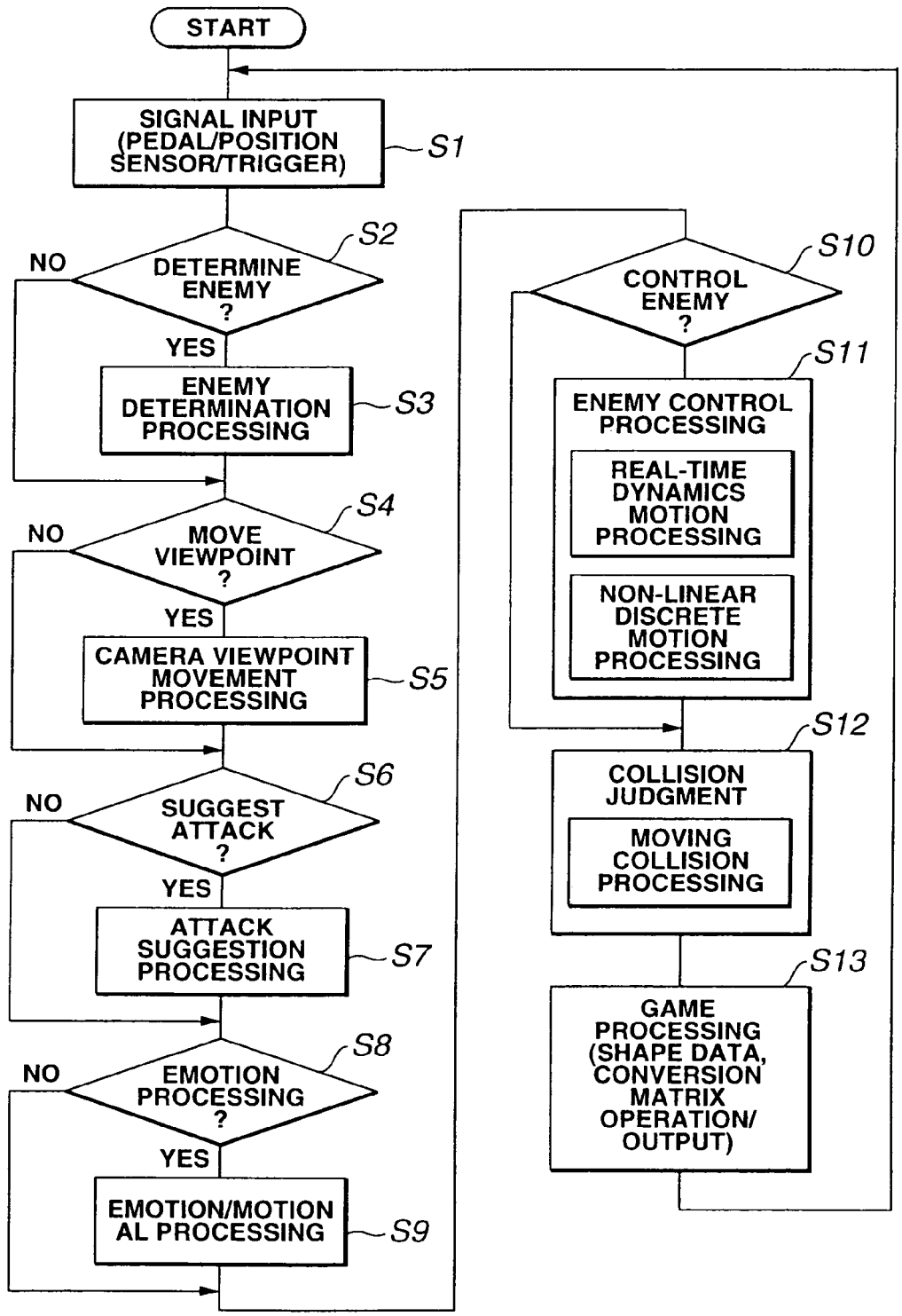
FIG. 5 is a schematic flowchart of the main routine processing executed by the CPU.

Next, explained is the image generation processing of the gun shooting game of the game device according to the present embodiment. FIG. 5 shows the main routine of the image generation processing. This main routine, for example, is repeatedly executed with the CPU 101 for each one field ($1/60$ seconds) synchronized with the display interrupt.

Foremost, the CPU 101 reads information of the pedal sensor 4, trigger of the gun unit 11, in other words, the position sensor 5 (step S1).

Next, the CPU 101 judges whether the target enemy has been decided or not (step S2). If decided, the next enemy determination processing (step S3) is skipped, and an enemy to be the viewpoint target among the plurality of enemies is determined as a predetermined enemy by the system side since a target enemy is not decided in the initial state of the game (step S3). Thereby, at the initial stage of the game, a game space with the predetermined enemy in the center is displayed on the display 1a. The target enemy, however, will change in accordance with the game progress.

Then, the CPU 101 successively executes the processing from steps S4 to S12. These processing steps are characteristic to the present invention.

First, performed is the processing for moving the camera viewpoint toward the decided or previously determined target enemy (steps S4, S5). Thereby, when the target enemy deviates from the camera viewpoint, the camera viewpoint follows this enemy. The camera viewpoint is moved such that the composition of the enemy on the display is at an optimum position. The processing of moving the camera viewpoint is explained later.

Further, processing for suggesting to the player an attack from the enemy is executed (steps S6, S7). As the enemy controlled by the system side is hunting the player, this is to make the player priorly recognize that he/she is in a situation of a "dangerous state". This attack suggestion processing is also explained later.

Moreover, processing referred to as "emotion/motion AI (artificial intelligence) processing" is executed (steps S8, S9). This emotion/motion AI processing is processing for simulating the emotions of human beings in a more realistic manner by adding the factor of "emotion" to the AI, which controls the behavior of enemies, comrades, and other people in the game. This emotion/motion AI processing is also explained later.

In addition, processing for controlling the behavior and movement of enemies is executed (steps S10, S11). This processing includes "real-time dynamics motion processing" and "non-linear discrete motion interpolation processing" to enemies. Pursuant to both such processing steps, the display of the behavior and movement of enemies is expressed more realistically. This processing is also explained later.

Furthermore, collision judgment processing (collision processing) between the bullet and enemy, obstacle is executed (step S12). This collision judgment processing includes processing referred to as "moving collision processing" which creates a dynamic sensation by moving the collision face. This processing is also explained later.

After the completion of these various characteristic processing steps, the CPU 101 then executes the game processing (step S13). In other words, a conversion matrix is generated for perspectively converting the three-dimensional game space seen from the camera viewpoint confirmed at step S5 into the two-dimensional perspective screen and this is designated to the geometrizer 110, and further, parts (formed of a plurality of polygons) representing characters and obstacles such as enemies are designated to the geometrizer 110. The conversion matrix and polygon data designated above are reflected to the various factors of the behavior calculations processed in the aforementioned steps S5, S7, S9, S11, and S12.

When this game processing is completed, the processing returns once again to step S1, and the above series of processing steps are repeatedly executed for each fixed time frame. As a result thereof, image data of the respective frames simulated for each fixed time frame is successively displayed as the game screen in real time on the display 1a, and the game image is developed pursuant to the lapse in time.

Next, details of the various characteristic sub routines, which are executed during the aforementioned main routine, of the present invention are described below.

[Camera Viewpoint Movement Processing]

Figure 7:
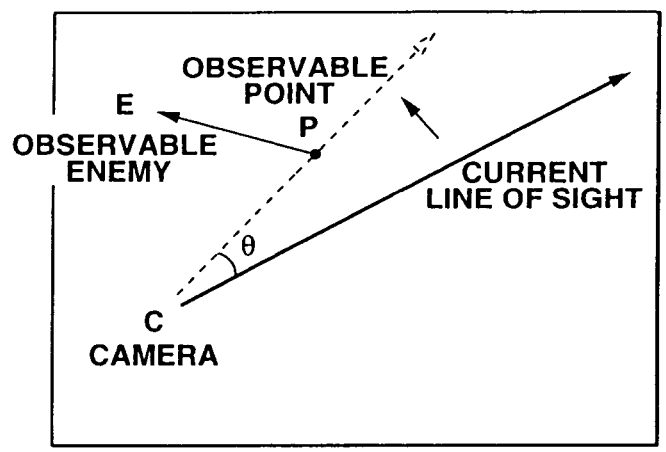
FIG. 7 is a diagram explaining the camera viewpoint movement control.
Figure 8:
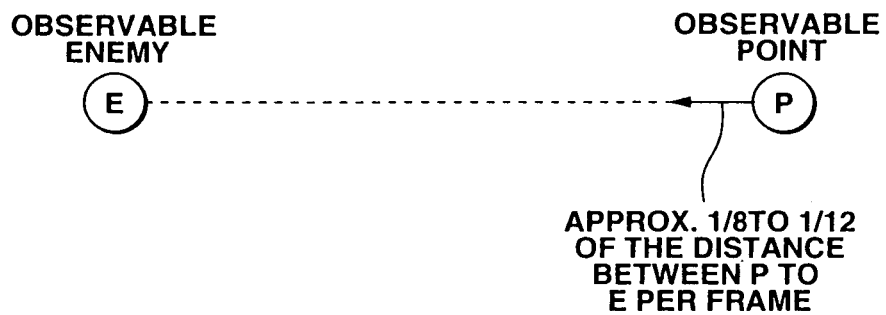
FIG. 8 is a diagram explaining the camera viewpoint movement control.

The camera viewpoint movement processing is now explained with reference to FIGS. 6 to 8.

Figure 6:
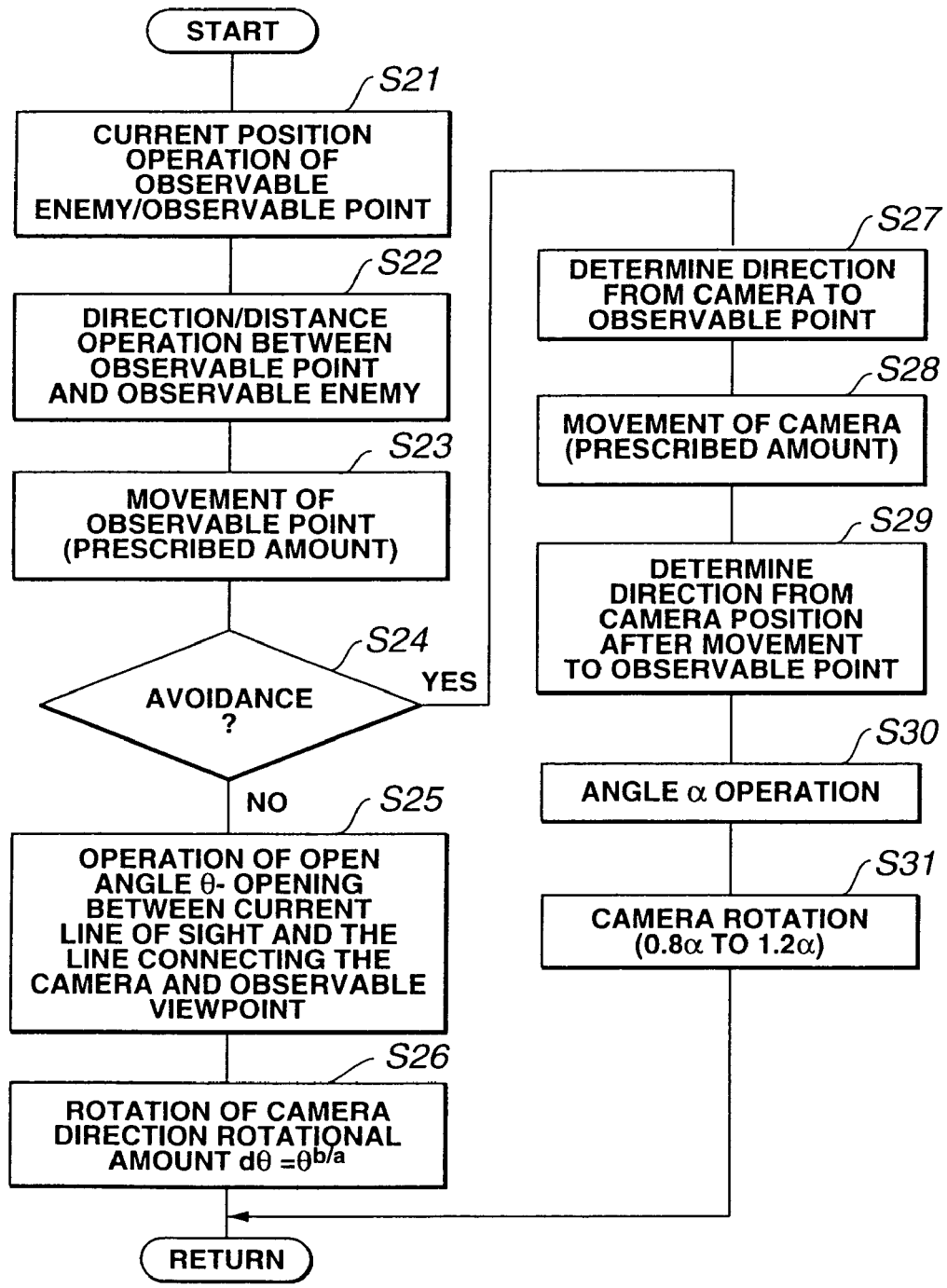
FIG. 6 is a schematic flowchart of the subroutine showing the camera viewpoint movement control processing.

FIG. 6 shows a detailed example of the camera viewpoint movement processing to be executed by the CPU 101 at step S5 of the main routine. Here, as shown in FIG. 7, the observable point P is moved toward the observable enemy E, and the line of sight of the camera C (central line of the visual field when the viewpoint is placed on the camera) is made to follow the direction of such observable point P. That is, the observable point P is the target point of the line of sight of the camera C, and the observable enemy E is the moving target point of the observable point. The movement of the camera line-of-sight is processed by being divided into cases of the occurrence of "avoidance" where the player tries to avoid a bullet, and a normal state where no such avoidance has occurred.

Foremost, the current positions of the observable enemy E and observable point P are operated (step S21). Next, the direction and distance between the observable enemy E and observable point P are operated (step S22). Then, operation is performed so as to move the observable point P a prescribed distance toward the observable enemy E side. FIG. 8 shows a typical example of such movement. The observable point P is moved toward the observable enemy at $1/8 \sim 1/12$ of the distance between the observable point P and observable enemy E for each frame ($1/60$ seconds). This distance may be suitably selected.

Figure 9:
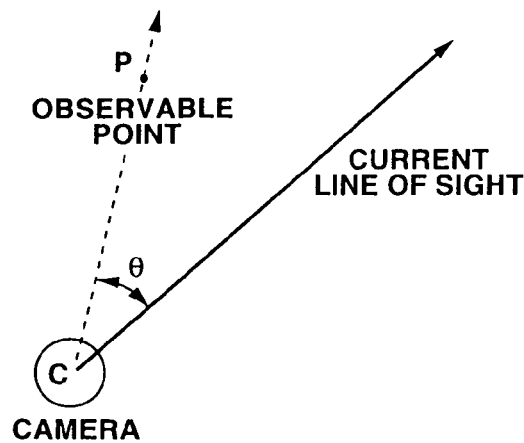
FIG. 9 is a diagram explaining the camera viewpoint movement control.

Based on the input signals of the pedal in step S1 of the main processing, judged is whether the "avoidance" motion, where the player tries to avoid the bullet, is being conducted (step S24). When the judgment is NO at this step S24, it is normal, and steps S25 and S26 are successively executed. Foremost, operated is the open angle θ formed by the current camera line-of-sight and the line connecting the camera position and the observable point P (step S25: cf. FIG. 9). Operation is conducted such that the current camera line-of-sight is rotated toward the observable point P side for minute angle d θ determined by dθ=θ b/a per frame with respect to the open angle θ (step S26). Here, a and b are coefficients. Coefficient a is a value for determining the speed upon rotating the camera at θ degrees, and larger the value of coefficient a, the slower the speed. A suitable value may be preferably set as coefficient a. Coefficient b represents the change in speed during the rotation of the camera, and smaller the value of coefficient b, the steadier the speed. A value of 1 or 2 (preferably about 1.5) is set as coefficient b, and it is thereby possible to provide a sense of following similar to human motion.

Meanwhile, when YES is judged at step S24, the control processing of the camera position and direction (line of sight) upon avoidance is executed at steps S27 to S31. These processing steps not only control the direction (line of sight) of the camera, they are characterized in also pertaining to the movement of the camera position.

Figure 10:
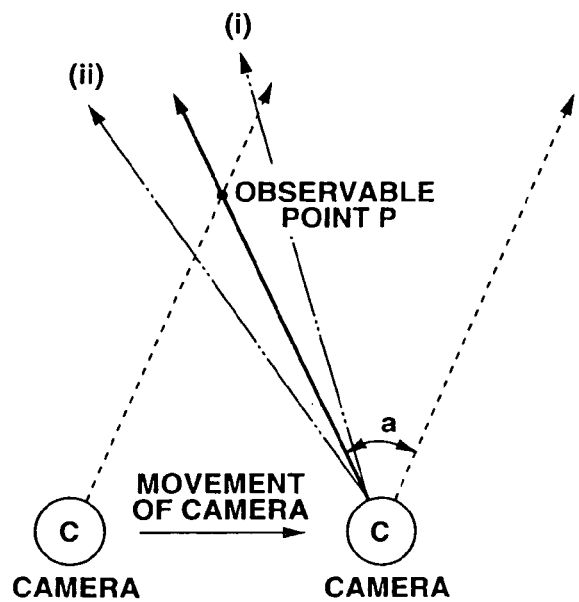
FIG. 10 is a diagram explaining the camera viewpoint movement control.

First, the current direction from the camera C to the observable point P is determined (step S27). Then, as shown in FIG. 10, the position of the camera C is moved a prescribed distance (step S28), and the direction from the camera position after movement to the observable point P is determined (step S29). Further, operated is the angle α formed by the direction of the camera to the observable point before movement and after movement (step S30). Then, operation for rotating the direction of the camera (direction of line of sight) 0.8α~1.2α is executed. Thereafter, the processing is returned to the main processing.

By rotating the direction of the camera C α degrees as above, the outward appearance of the observable point on the screen will not change, and the sight of the observable point will not be lost. When a player manipulates the pedal during the game and an avoidance occurs (including cases when the system side judges danger and makes an avoidance), the player may lose sight of the enemy on the screen with the aforementioned ordinary control of the camera line-of-sight since the movement is too sudden. With the present control of the camera position and direction upon an occurrence of avoidance, such circumstances can be avoided with certainty.

The actual rotational amount of 0.8α~1.2α for rotating the camera direction is made to have versatility. Therefore, if the rotational amount is set slightly smaller than the open angle α (0.8α for example) (cf. virtual arrow (i) of FIG. 10), as the observable point P will move slightly toward the direction of camera movement, a sense of movement will be provided to the player. This will also increase the difficulty of the game. Contrarily, if set slightly larger than the open angle α (1.2 α for example; cf. virtual arrow (ii) of FIG. 10), as the observable point P will move slightly in the direction opposite to the camera movement, a sense of circling around will be provided to the player. This will also increase the difficulty of the game.

[Attack Suggestion Processing]

Figure 11:
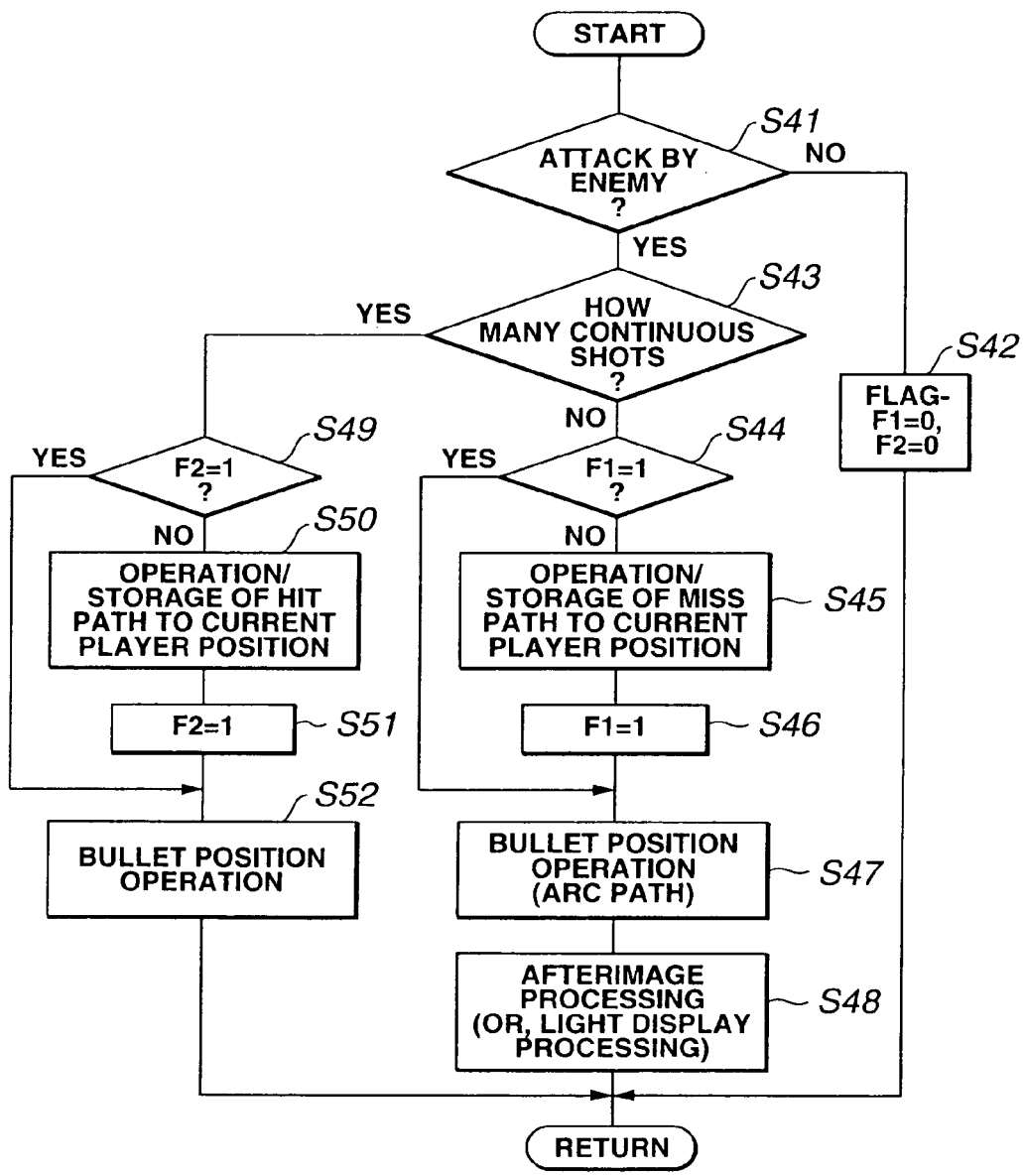
FIG. 11 is a schematic flowchart of the subroutine showing the attack suggestion processing.

FIG. 11 shows one example of the attack suggestion processing executed at step S7 of the main routine processing. This processing is also executed with the CPU 101.

Foremost, judged is whether an attack from the enemy will begin, or has begun (step S41). When this judgment is NO; that is, when the enemy is not attacking (shooting) the character simulating the player, flags F1 and F2 showing the attack suggestion processing are set to zero and the processing is returned to the main routine (step S42).

Figure 12:
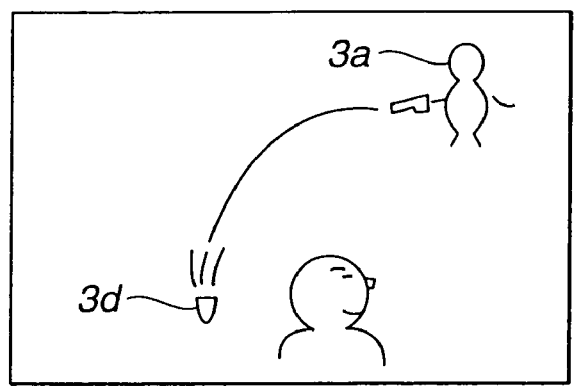
FIG. 12 is a diagram showing an example of a game screen according to the attack suggestion processing.

When the judgment is YES at step S41, judged is whether the bullets fired from the enemy in a series have reached m number of bullets (step S43). The letter m representing the number of bullets fired in a series is set, for example, to m=4. If this judgment is NO; in other words, that it has not yet reached the m number of bullets fired in a series, further judged is whether flag F1=1 (step S44). If the judgment here is NO, a bullet path deviating a prescribed distance from the position in the game space (virtual three-dimensional space) of the character simulating the current player is operated and stored (step S45). In order to suggest to the player of a dangerous situation of being hunted by an enemy, this path is operated, as shown in FIG. 12, to be of an arc.

Next, in order to complete this path calculation, flag F1 is set to F1=1 (step S46). When the judgment at step S44 is YES, the processing steps of S45 and S46 are skipped.

Then, based on the operated arc-shaped bullet path, the bullet position per display frame is operated (step S47). Further, processing for leaving an afterimage on the path of the bullet of the operated position is performed (step S48). The afterimage processing at this step S48 may be omitted depending on the situation. Thereafter, the processing is returned to the main routine processing.

Meanwhile, when it is judged as YES at step S43, based on the processing of the system side, m number of bullets are made to come flying in an arc so as to graze the character simulating the player. As these m number of bullets are set such that they will not hit the character, the player is given some time upon recognizing that the enemy has begun the attack. Thus, seasoning is given to the game where a player will not suddenly be defeated simultaneously with the commencement of the enemy attack. While the m number of bullets come flying, the player is able to actually feel that he/she is being attacked (hunted).

Therefore, when it is judged as YES at step S43, confirmed is whether the other flag F2=1 (step S49). When flag F2=0, the bullet path to hit the character in relation to the position in the game space of the character simulating the current player is operated and stored (step S50). Next, in order to complete this path calculation, flag F2 is set to 1 (step S51). When the judgment at step S49 is YES, the processing steps of S50 and S51 are skipped.

Thereafter, operated is the position of the bullet per display frame based on the operated bullet path (step S52). The processing is then returned to the main routine processing.

Since the attack suggestion processing is as described above, the player may perceive the dangerous state in light of several bullets that come flying in an arc while grazing the such player's character. Thereby, the player may proceed to actions of manipulating the pedal for avoidance (changing the position), and such player will not be suddenly defeated by the enemy attack. Accordingly, it is possible to add the seasoning of heightening the amusement in the game. By setting the number of bullets to an adequate number, the natural flow of the game can be secured, and such methods for making the player recognize the dangerous state by displaying unnatural marks become unnecessary.

Moreover, as a substitute for the afterimage processing at step S48, the recognition of the player may be heightened by employing a display processing of light such that the gun reflects light and shines.

Although explained above is the processing for suggesting the attack from an enemy character on the premise that a character simulating the player is displayed on the screen of the display, this processing may also be employed in gun shooting games which do not display a player character on the screen or similar game scenes. In such a case, image processing may be performed similar to the above such that the bullets representing the attack of the enemy character, for example, will come flying along a path "in the vicinity of a priorly set area where the player will be hit and within the area displayed on the screen." Thereby, the player in the actual space viewing the screen will have the feeling of himself/herself existing in the virtual space and being attacked by the enemy. Therefore, the similar working effect as above can be obtained.

Regarding the m number of warning shots described in step S43 in aforementioned FIG. 11, the following modification example may also be added thereto. That is, during the process the warning shots reaching m number of bullets, the distance between the landing point and hitting point of the warning shots (camera position of the player viewpoint or position of the character simulating the player) is gradually shortened in accordance with the increase in the number of warning shots. This produces a feeling of the aim of the enemy gradually becoming more accurate, and more powerfully suggested is the "dangerous" state in the game.

[Emotion/Motion AI Processing]

Figure 13:
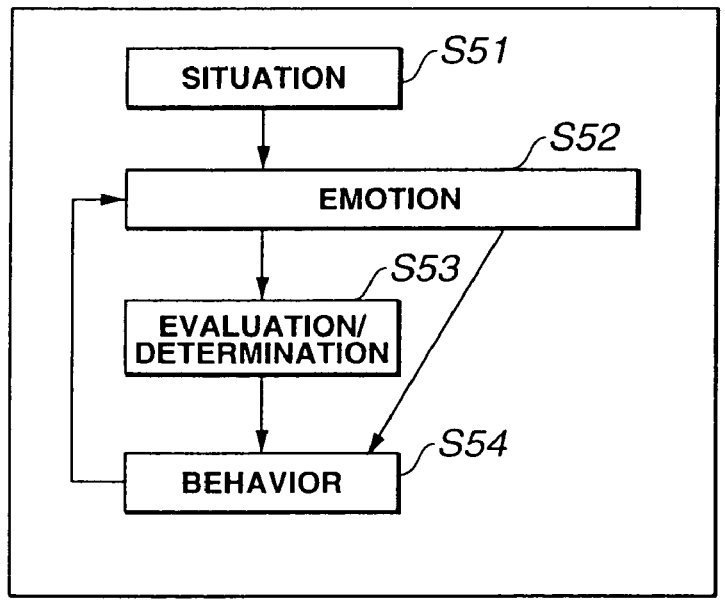
FIG. 13 is a schematic flowchart of a subroutine showing the emotion/motion AI processing.

FIG. 13 shows one example of the emotion/motion AI processing executed at step S9 of the main routine processing. This emotion/motion AI processing aims at realizing a more human-like movement by controlling the person character appearing in the game pursuant to AI inclusive of the emotion factor.

Figure 14:
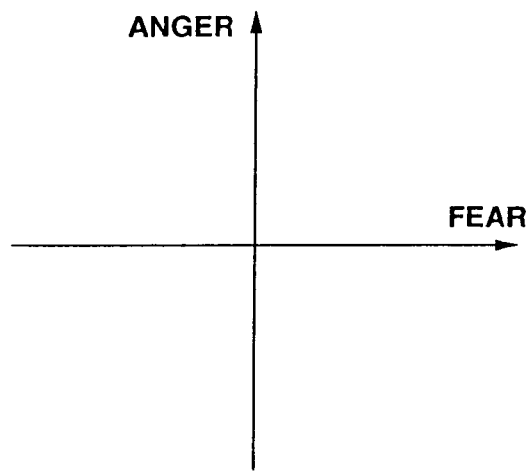
FIG. 14 is a diagram explaining a two-dimensional representation of the emotion factor.
Figure 15:
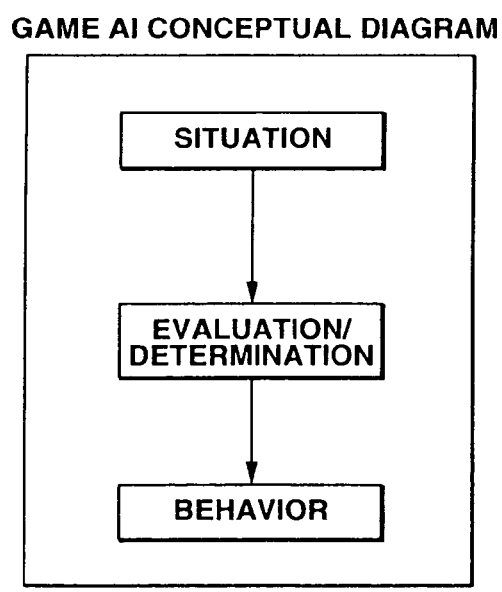
FIG. 15 is a schematic flowchart of a subroutine showing the AI processing for comparative explanation.

As shown in FIG. 13, input to this emotion/motion AI processing are the situation factor (step S51), emotion factor (step S52), evaluation, determination factor (step S53), and behavior factor (step S54) in the aforementioned order of influence. The emotion factor, as shown in FIG. 14 in the present embodiment, is represented two-dimensionally with anger and fear. This emotion does not necessarily have to be two-dimensional, and adopted may be an adequate dimension. Moreover, the behavior factor is recurrently reflected on the emotion factor. The emotion factor may directly influence the behavior factor. This emotion/motion AI processing is characterized in that the emotion factor has been introduced, and this emotion factor mutually influences and is influenced by the evaluation, determination, and behavior factor, and the final action of the person is decided thereby. FIG. 15 shows the AI processing in comparison to the processing of FIG. 13.

A specific example of the emotion/motion AI processing of FIG. 13 is shown below.

a. The following are examples of the "situation" influencing the "emotion":

a-1: In the case of an enemy

When the player's bullet passes near, "fear" rises.

When the player defeats one's comrade, "anger" rises.

When an enemy that will not die with one hit sustains damage, "anger" rises.

When the player character sustains damage, both "anger" and "fear" will lower.

When shooting at the player but the bullets are avoided and miss, "anger" rises and "fear" lowers.

Pursuant to the lapse in time, both "anger" and "fear" will lower.

a-2: In the case of a civilian:

When a bullet passes near, "fear" rises.

When another person dies, "fear" rises.

Pursuant to the lapse in time, both "anger" and "fear" will lower.

b. The following are examples of the "behavior" influencing the "emotion":

When one fires a bullet and becomes relieved, "anger" lowers.

When one continuously fires bullets and becomes numb, "anger" lowers.

c. The following are examples of the "emotion" influencing the "evaluation/determination":

When "fear" is strong, one does not shoot and hides.

When "anger" is strong, one does not avoid danger and shoots continuously.

When "fear" is so strong, one becomes petrified.

d. The following are examples of the "emotion" influencing the "behavior":

When "fear" is weak, the hit rate is high.

When "fear" is strong, the hit rate is low.

When "anger" is strong, movement upon attacking becomes quick.

As a result of setting the emotion/motion AI as above, it is possible to alleviate or exclude representations of unnatural movements as a person (e.g., becoming suddenly calm although frightened up until then), and the game will be represented more realistically. For example, in the game of this embodiment, the first shot from the enemy will not hit the player, and a path is set such that the last bullet of a series of shots will hit the player. Thus, when the "hit rate of bullets" becomes high pursuant to the aforementioned emotion AI, for example, the setting of the fourth bullet hitting the player will be made such that the third bullet will hit the player. Contrarily, when "both fear and anger are high," it is possible to accurately represent the panic as with human mentality wherein, although the player will shoot furiously without stopping, it is difficult to hit the target.

Further, if there are several persons in the game, each person will be able to move autonomously pursuant to the emotion/motion AI of such person. Thus, without having to control the overall group of people, it is possible to represent the picture of the group more realistically.

Moreover, as it is not necessary to hold a rule base for determining all actions as with conventional processing, there is also the advantage of lightening or restraining the data load and operational load.

[Real-time Dynamics Motion Processing]

Figure 16:
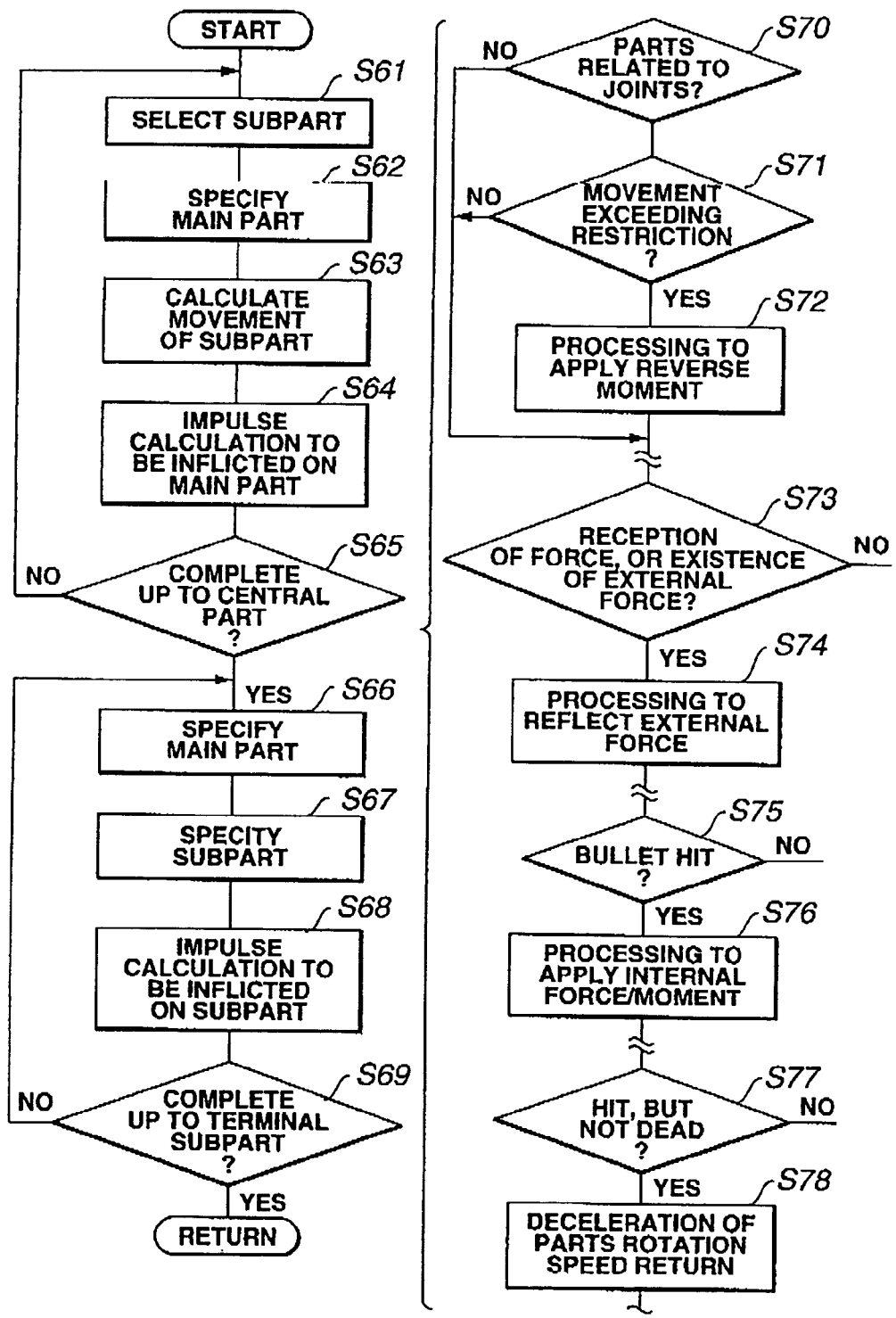
FIG. 16 is a schematic flowchart of a subroutine showing the real-time dynamics motion calculation processing.

FIG. 16 shows one example of the real-time dynamics motion processing executed with the CPU 101 at step S11 of the main routine processing.

This motion processing paid attention to the characteristics of the parts (the respective parts are formed of a plurality of polygons) structuring a person character. That is, among the parts structuring the body, as the main parts have more mass than the subparts, there is a characteristic that the connection points with the main parts may be deemed as the fixed points for the subparts.

The division of main parts and subparts adopted in this embodiment is for the sake of convenience, and the part at the end side of the body (far from the body) among the two adjacent parts is referred to as the subpart, and the part at the center side of the body (near the body) is referred to as the main part.

Figure 17:
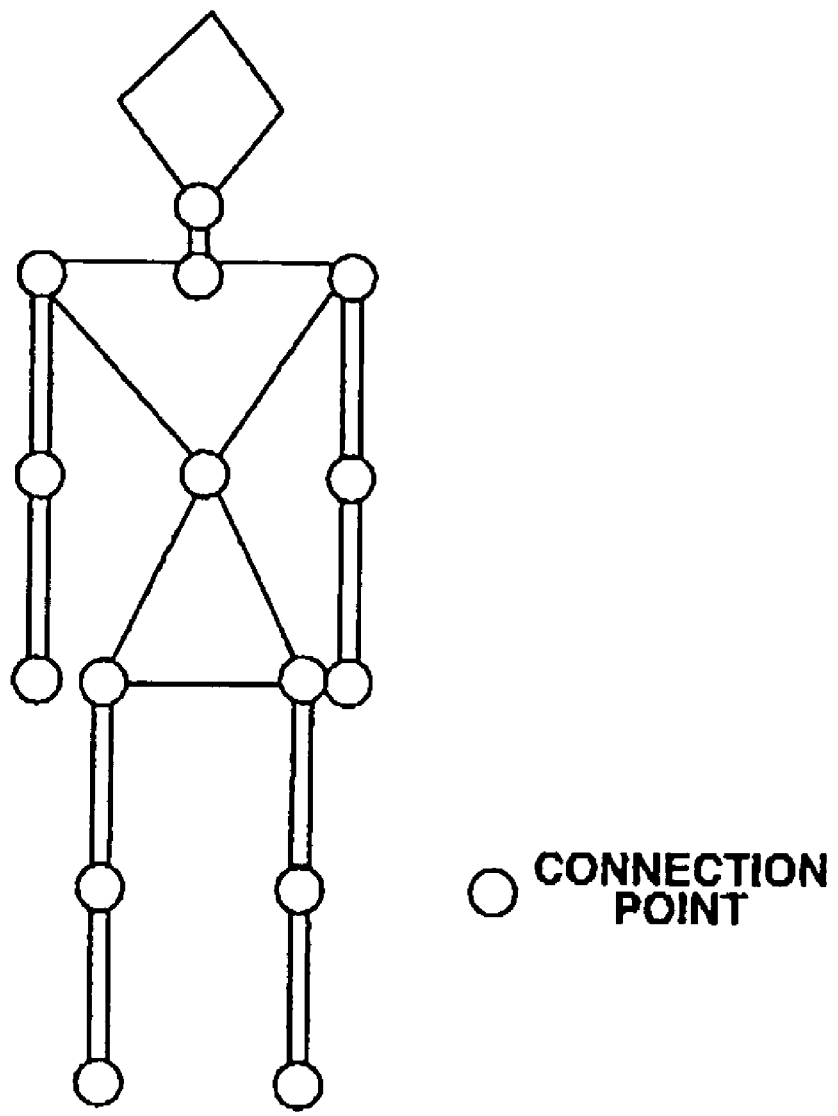
FIG. 17 is a diagram representing a person structured of a plurality of parts.

FIG. 17 shows an example representing a person using 16 parts. The black circles of FIG. 17 show the connection points between the parts.

Thereby, as shown in FIG. 16, the CPU 101 first selects the subparts at the very end of the body (step S61), and then specifies the main parts thereof (step S62). Here, the connection points between the subparts and the main parts are deemed fixed points, the movement of the subparts is calculated (step S63), and, thereafter, the impulse (power×time) to be provided to the main parts is calculated (step S64). The movement of the subparts and the impulse to be provided to the main parts are calculated upon deeming the respective parts as a rigid body.

The series of processing steps are recurrently repeated for the respective parts structuring the body, from end parts to main parts, and to the main parts to be connected to such subparts, with such main parts being the subparts (step S65). This repetition is continued until the subpart becomes the most central part (a part where there is no other main part; the calculation would be simplified if waist parts requiring the central position of gravity as this center part are adopted).

Upon reaching the center part, contrarily, the main parts are specified (step S66). The first main part is the center part. Next, subparts are specified (step S67) and the impulse to be inflicted on the subparts is calculated based on the movement of the main part (step S68). This reverse calculation is recurrently repeated in order with the subpart being the main part until the end (step S69).

By controlling the motion of characters as above, upon making one motion, a human's body will move from the end or end side, such movement is relayed to the central part side of the body while the movement or restriction from the central part side is mutually added to the end side, and a more natural and smooth motion is represented pursuant to such form.

Further, various seasoning-like processing may be added to this motion calculation. For example, as restrictions accompany the movement of joints, reverse moments are provided to parts trying to move exceeding such restrictions (steps S70 to S72). Thereby, human-like and accurate movements can be represented. Moreover, when force is inflicted on the parts upon contact with external objects such as walls, floors, or bullets, or when external force such as gravity exists, calculation with such force added thereto is conducted (steps S73, S74). Here, when phenomena such as the parts caving into the floor due to differences in the calculation occur, it is desirable that appropriate corrections are made and processing for making such phenomena inconspicuous is conducted. Further, as a human generates internal force pursuant to phenomena such as the contraction of muscles upon feeling pain, processing for adding internal force or moments can be implemented at the instant a person is hit by a bullet (steps S75, S76). It is therefore possible to represent realistic movement. Moreover, humans have a function of autonomously amending their posture in order not to fall down. In order to express the situation of "I'm hit, but not dead yet", it is preferable to execute processing for decelerating the rotation speed of the parts (steps S77, S78). This will enable the representation of "endurance", and the realistic movement is further enhanced. The processing of these steps S70 to S78 may be suitably combined and executed for the selected additional items by being arranged appropriately in a position during the series of processing steps S61 to S69.

In the aforementioned real-time dynamics motion processing, the order of motion calculation may be conducted from the end side among the plurality of parts representing the body, or from the central part of the body, and there is no limitation in the order thereof. When an impact is inflicted, calculation may be conducted in the order of such inflicted part.

[Non-linear Discrete Motion Interpolation Processing]

Figure 18:
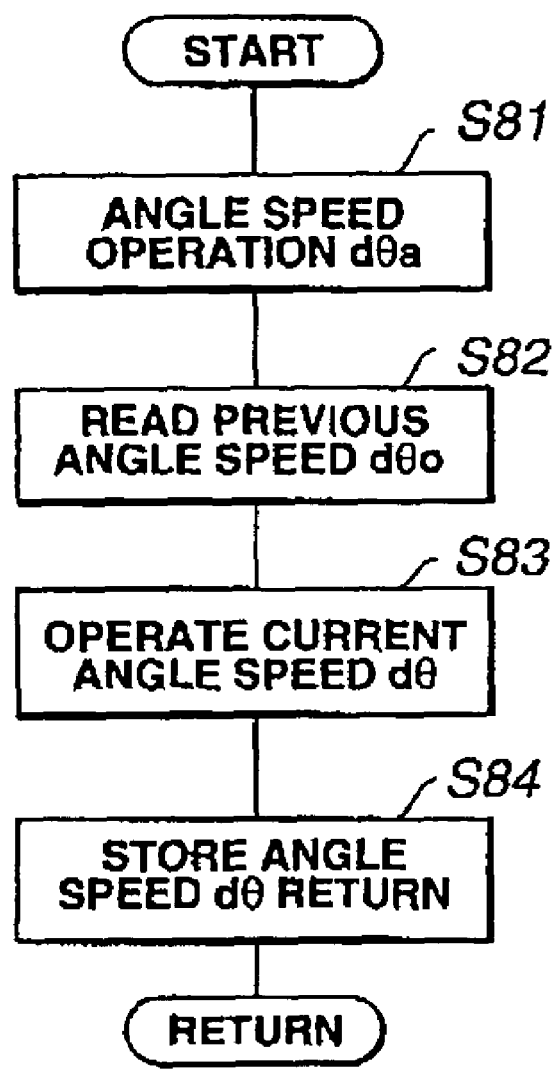
FIG. 18 is a schematic flowchart of a subroutine showing the non-linear discrete motion interpolation processing.

FIG. 18 shows one example of the non-linear discrete motion interpolation processing executed with the CPU 101 at step S11 of the main routine processing.

Figure 19:
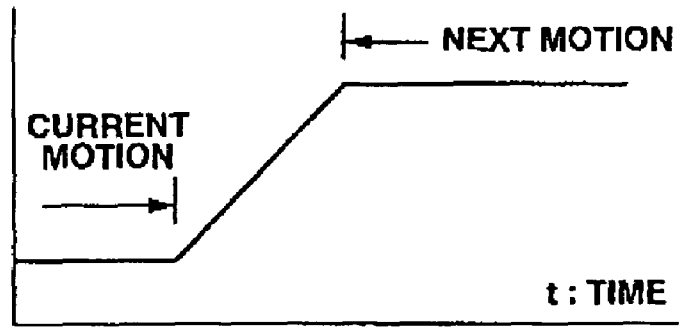
FIG. 19 is a diagram showing an example of a functional curve of linear interpolation, which is conventional motion interpolation.
Figure 20:
FIG. 20 is a diagram showing an example of a functional curve of three-dimensional curve interpolation, which is another conventional motion interpolation.

Here, motion interpolation processing shall mean the interpolation processing for generating movements connecting two motions; for example, "turning back" after "running". As methods conventionally known for this type of interpolation processing, there are the liner interpolation processing shown in FIG. 19 and the three-dimensional curvilinear interpolation processing shown in FIG. 20. Motion interpolation by linear interpolation processing represents the movements connecting the motions with linear functions, and, although there is an advantage of the calculation load being light, it lacks the smoothness of the connection between the motions. Meanwhile, motion interpolation by the three-dimensional curvilinear interpolation processing represents the movements connecting the motions with three-dimensional curvilinear functions, and, although the connection of the movements is smooth, the function curve cannot be calculated unless the current motion and the next motion are designated. There is a further disadvantage in that the calculation load will increase due to the calculation of the spline curve.

In order to overcome these problems, provided is non-linear discrete motion interpolation processing. This motion interpolation processing is a method of directly calculating the function curve of the motion as discrete data, and not as consecutive functions.

Specifically, as shown in FIG. 18, based on the current angle θo, target angle θa, and frame number f until reaching the target angle, the angle speed dθa required for reaching the target is calculated (step S81) with the following formula:

$$d\theta a = (\theta a - \theta a)/f$$

Figure 21:
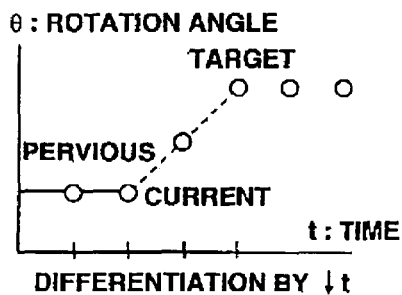
FIG. 21 is a graph showing the steps of non-linear discrete motion interpolation processing.
Figure 21:
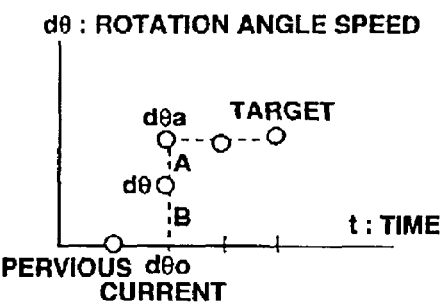
Figure 21:
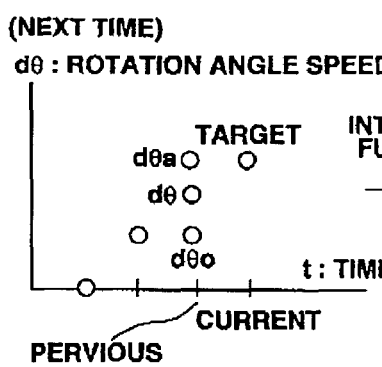
Figure 21:
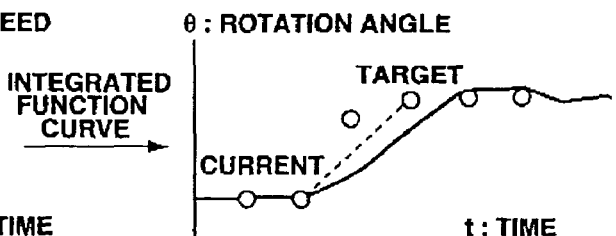

This means that the state shown in FIG. 21(a) is differentiated by the number of frames; i.e., time t, and converted to the state shown in FIG. 21(b).

Next, the previous angle speed dθo is read from the memory (step S82), the point between the calculated angle speed dθa and the read previous angle speed dθo is assumed to be the current angle speed dθ, and angle speed dθ is calculated (step S83) with the following formula:

$$d\theta = (A \cdot d\theta o + B \cdot d\theta a)/(A+B)$$

A to B is the distance for determining the angle speed dθ by dividing the segments connecting angle speeds dθa and dθo at the upper part of FIG. 21(b). According to this formula, the state of FIG. 21(b) may be converted to the state shown in FIG. 21(c). Here, if A=B, the position of the current angle speed dθ will be set to be the middle point. The larger distance A is set than distance B, the larger the representable inertia.

The currently operated angle speed dθ is stored in the memory as the previous angle speed dθo in the subsequent interrupt (step S84).

The time integrated function curve of the angle speed dθ calculated per interrupt as above is show in FIG. 21(d).

As clear from FIG. 21(d), inertia is given to the motion upon moving from the current motion to the subsequent motion and, without exactly stopping at the target angle, becomes a heavy-feeling motion. By suitably adjusting this inertia, such inertia may be positively utilized, and in comparison to three-dimensional curvilinear interpolation, represented is a realistic and heavy-feeling motion with a smooth connection. And even if abruptly switching during the motion, pursuant to the inertia, it is possible to proceed to the next motion smoothly. Meanwhile, as the processing is conducted with a discrete value and not a continuous function, even in comparison to linear interpolation, the processing load will not be that heavy. The advantage lies in the smooth motion interpolation with a lightened operational load.

[Moving Collision Processing]

Figure 22:
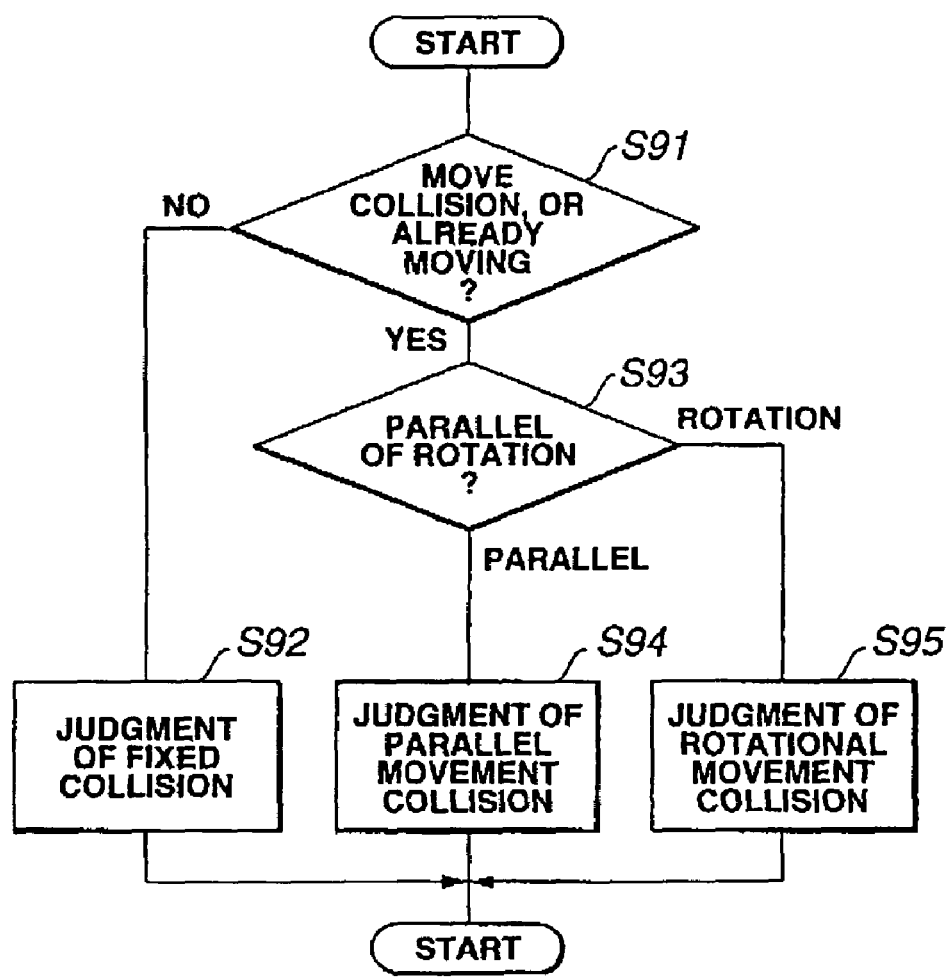
FIG. 22 is a schematic flowchart of a subroutine showing the collision movement control processing.

FIG. 22 shows an example of moving collision processing executed by the CPU 101 at step S12 of the main routine processing.

In conventional games, collisions of stages were not moved. The present invention enables such movement, and endeavors to provide a more dynamic game progress. This moving collision processing, by fixing the coordinate system of the collision face, calculates the movement of the collision face by outwardly erasing such face.

Figure 23:
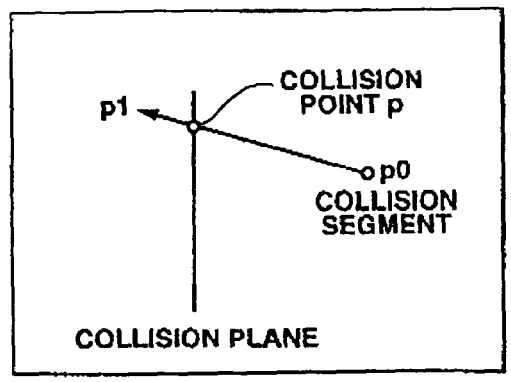
FIG. 23 is a diagram explaining the collision judgment of a fixed collision plane.

Foremost explained is the existing processing of a non-moving fixed collision. As shown in FIG. 23, when not moving the collision plane (e.g., ground, walls, etc.), the collision point p may be easily obtained from this collision plane and the ordinary collision segment (e.g., bullet path) by calculating the intersecting point of the straight line and the plane.

The present invention moves the collision dynamically, and as shown in FIG. 22, the CPU 101 judges per interrupt whether to move the collision or whether it is moving (step S91). If the judgement is NO (not to move), the routine proceeds to step S92, and judges the aforementioned fixed collision. However, when moving the collision, the routine proceeds to step S93, and it is further judged whether the movement is parallel or a rotation.

Figure 24:
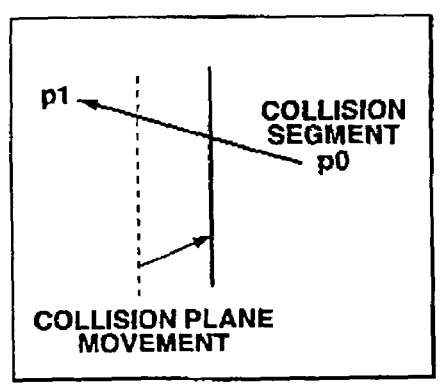
FIG. 24 is a diagram explaining the collision judgment of a parallel movement collision plane.
Figure 24:
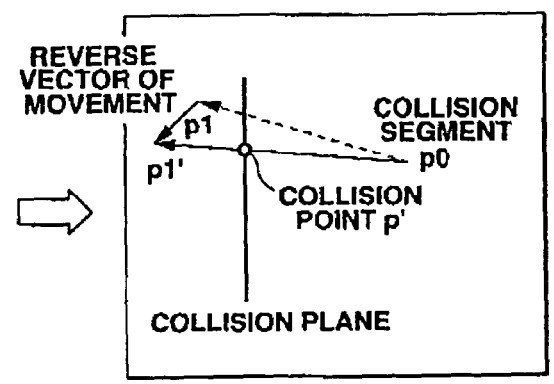

When this judgment is parallel, the routine proceeds to step S94 and judged is the parallel movement collision. Specifically, as shown in FIG. 24(a) and FIG. 24(b), when moving the collision plane in parallel, the coordinate system is fixed to the collision plane, and the terminus p of the collision segment is moved in the distance of the reverse vector of the parallel movement vector of the collision. Thereupon, the intersecting point p' of the plane and segment is sought as the collision point, and thereafter, conversion for restoring the coordinate system of p' is conducted for obtaining the intersecting point p.

Figure 25:
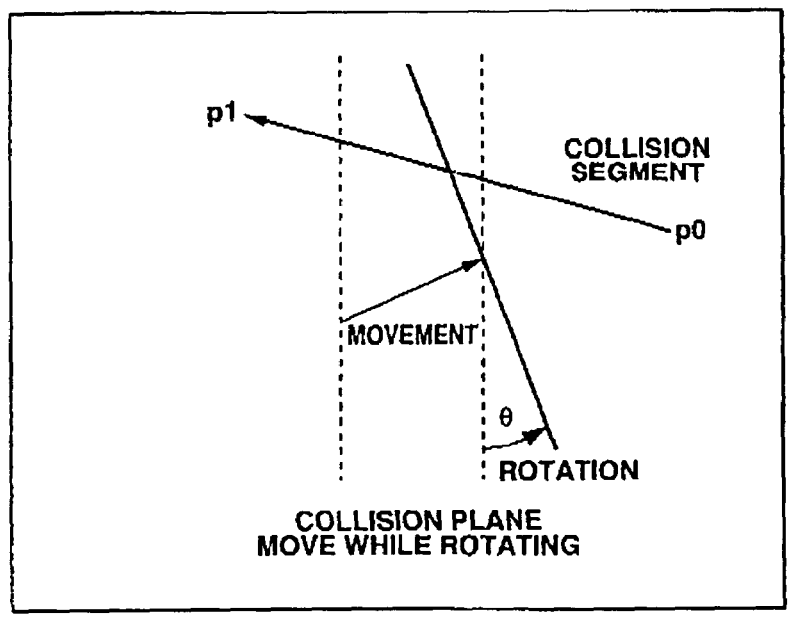
FIG. 25 is a diagram explaining one step of the collision judgment of a rotational movement collision plane.
Figure 26:
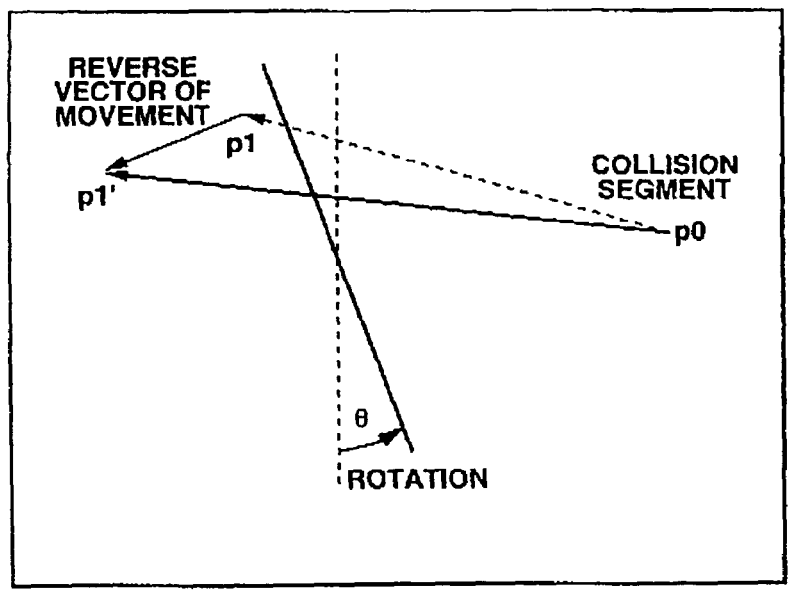
FIG. 26 is a diagram explaining one step of the collision judgment of the rotational movement collision plane.
Figure 27:
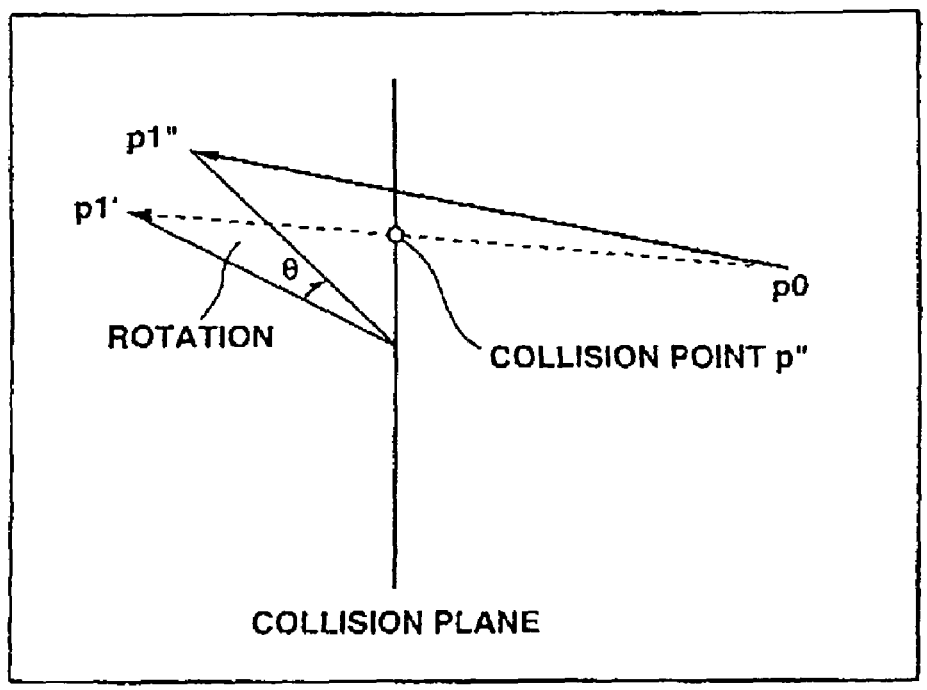
FIG. 27 is a diagram explaining one step of the collision judgment of the rotational movement collision plane.

Meanwhile, when the judgment at step S23 is a rotation movement, judgment of the rotation movement collision is made at step S95. Particularly, as shown in FIGS. 25 through 27, upon rotatively moving the collision plane, similar to the parallel movement, the terminus p1 of the collision segment is moved in a distance of the reverse vector of the parallel movement vector of the collision plane, and made p1' (cf. FIGS. 25 and 26). Thereby, the influence pursuant to the parallel movement can be outwardly erased.

Next, the terminus p1' of the collision segment is rotated $-\theta$ with the origin of the collision plane as the axis, and made p1" (cf. FIG. 27). According to the aforementioned operation, the coordinate system of the collision plane is fixed, and the influence of the collision movement and rotation may be outwardly erased. Thereby, the intersecting point p" of the segment p0–p1" and the collision plane is sought as the collision point, and by performing reverse operation to this point, the intersecting point p is obtained.

According to the above, by moving the collision face such as walls and the ground while performing collision judgment with the collision segment such as a bullet, a dynamic game screen is generated not possible heretofore.

Further, upon rotatively moving the collision plane, the rotational origin thereof does not necessarily have to be on the collision plane, and may be outside the collision plane. In an actual calculation, the collision segment is represented in the vector formula of "$p=p0+(p1-p0)t$". When t is computed during the calculation of p' or p", immediately thereafter, by substituting this formula, it is possible to omit the trouble of reconverting the coordinates after calculating the coordinates of p' and p". In the aforementioned embodiment, although the collision face was described as a plane, the same method may be used to calculate the collision face even if it were a curved face. Moreover, it is preferable that the rotational angle $\theta$ of the collision face is a sufficiently small value. If this rotational angle $\theta$ is too large, differences in the calculated coordinates of the collision point may increase. Here, the calculation should be made upon dividing the rotation a certain number of times.

The enemy explained here shall mean a target, enemy, or a subject of attack to be operated by the computer of the game machine main body side.

INDUSTRIAL APPLICABILITY

As described above, the present invention provides an image generating device suitable for gun shooting games and the like, having abundant realism and ambience than conventionally, considerably heightens the game feeling and game amusement, and which does not suffer the operational processing in comparison to conventional devices.

Specifically, it is possible to increase the ambience and considerably enhance the interest in the game feeling and game amusement by making the player recognizing the "dangerous situation" with accuracy. Moreover, provided is a game device suitable for gun shooting games and the like and which substantially enhances the interest in the game feeling and game amusement by making the camera viewpoint move properly with the movement of the enemy without losing sight of such enemy.

Further, provided is an image generating device suitable for gun shooting games and the like wherein the element of "action" resulting from "emotions" is provided to the AI controlling the character, the trouble and time required for the development thereof is suppressed, and which is abundant in realism and ambience without increasing the operational load than conventionally. Moreover, provided a game device capable of making the collision with structures other than the movable object, such as walls and obstacles, to be impressive, realizing dynamic game developments, increasing ambience, and considerably enhancing the game feeling and interest in the game.

Further, provided is a game device suitable for gun shooting games and the like, capable of improving the realism in the movement of parts structuring the character or the movement between the motions of the characters, increasing realism and ambience, and which does not suffer the operational processing in comparison to conventional devices.

What is claimed is:

1. An image generating device for generating images capturing a movable body moving within a virtual three-dimensional space from a viewpoint of a camera in said virtual three-dimensional space, comprising:

movement means for controlling the movement of said camera viewpoint based on a position relationship between an observable point in relation to said movable body and a line of sight of a current camera viewpoint; and artificial intelligence (AI) processing means for executing AI processing at least one of incorporating emotions of the movable body that influence and are influenced by circumstances, evaluation/determination, and factors of behaviors in said virtual three-dimensional space, wherein the AI processing determines an action which is independently associated with the movable body and calculates emotional factors based on the circumstances of said virtual three-dimensional space, wherein the emotional factors control behavior of the movable body.

2. An image generating device according to claim 1, wherein said virtual three-dimensional space is a game space, and said movable body is an enemy in a gun shooting game within said game space.

3. An image generating device according to claim 2, further comprising:
- display means for displaying said game space on a screen;
- a gun unit capable of producing signals on said screen when a player manipulates a trigger;
- a sensor for detecting an arrival position of said signals on the screen of said display means; and
- game implementing means for implementing a gun shooting game between said enemy and said player based on said arrival position.

4. An image generating device according to claim 3, further comprising:
- observable point moving means for moving said observable point toward said movable body for each display of one frame of said image, wherein a position of said observable point is at a different position than that of said movable body.

5. An image generating device according to claim 4, wherein said observable point moving means comprises:
- means for moving said observable point toward said movable body in prescribed distances, for each display of one frame of said image, along a straight line connecting said observable point and said movable object.

6. An image generating device according to claim 4, wherein said observable point moving means comprises:
- means for operating an open angle between a current line of sight of said camera and a line extending from the camera position through said observable point;
- means for operating a rotational angle based on the open angle; and
- means for rotating, for each display of one frame of said image, the current line of sight of said camera viewpoint toward said observable point by said rotational angle.

7. An image generating device according to claim 3, wherein said movement means comprises:
- judging means for judging the occurrence of specific circumstances of the relative position relationship between said camera viewpoint, which changes in accordance with manipulations of said player, and said observable point; and
- viewpoint movement control means for controlling the position of said camera viewpoint to continuously capture the position of said observable point.

8. An image generating device according to claim 7, wherein said viewpoint movement control means comprises:
- means for moving said camera; and
- means for rotating said camera viewpoint based on an angle between a line extending from said camera position through said observable point after movement of said camera and a line extending from said camera position through said observable point before movement of said camera.

9. An image generating device according to claim 8, wherein means for rotating said camera viewpoint rotates said camera viewpoint toward said observable point based on said angle.

10. An image generating device according to claim 9, wherein said viewpoint rotation means is means for rotating said camera viewpoint toward said observable point side based on an angle in which said angle is increased/decreased a prescribed value.

11. An image generating device according to claim 9, further comprising:
- avoidance manipulation means for said player to manipulate a character, which is a simulation of said player on a screen, to avoid a bullet fired from said enemy, wherein said judging means determines whether said avoidance manipulation means is in a manipulative state.

12. A storage medium storing a program for executing functions of at least one of the movement means, display means, game implementing means, observable point moving means, and avoidance manipulation means of the image generating device of any one of claims 1–11.

13. An image generating device for generating images allowing a player to play a gun shooting game with an enemy character existing in a virtual game space, comprising:
- image processing means for providing images suggesting to the player in advance an impending attack by said enemy character on said player, wherein the images include at least one image of at least one bullet fired by said enemy character and having a path toward said player in the virtual game space, and further wherein the path of the at least one bullet deviates from the position of the player until a predetermined condition is met.

14. An image generating device according to claim 13, wherein the image of said at least one bullet is an image of the at least one bullet flying in an arc.

15. A storage medium storing a program for executing functions of the image processing means of the image generating device of any one of claims 13–14.

16. An image generating device for displaying on a display images for a player to play a gun shooting game with an enemy character existing in a virtual game space, said image generating device comprising:
- artificial intelligence (AI) processing means for executing AI processing incorporating emotions of said enemy character that influence and are influenced by at least one of circumstances, evaluation/determination, and factors of behaviors in said game, wherein the AI processing determines an action which is independently associated with the enemy character and calculates emotional factors based on the circumstances of said game, wherein the emotional factors control behavior of the enemy character.

17. An image generating device for displaying on a display images for a player to play a gun shooting game with an enemy character existing in a virtual game space, said image generating device comprising:
- artificial intelligence (AI) processing means for executing AI processing incorporating emotions of said enemy character influenced by at least one of circumstances, evaluation/determination, and factors of behaviors in said game, wherein the AI processing determines an action which is independently associated with the enemy character, wherein said factors of emotions are represented by emotional elements of fear and anger in relation to said game.

18. An image generating device according to claim 17, wherein said AI processing means includes means for performing processing to reflect the results of behavior based on said factors of behaviors to said factors of emotions.

19. A storage medium storing a program for executing functions of the AI processing means of the image generating device of any one of claims 16, 17, 18.

20. An image generating device for generating images by representing a movable object simulating a person and moving inside a virtual three-dimensional space as a plurality of parts connected via connection points, said image generating device comprising:

first specifying means for specifying a subpart on a terminal side and a main part on a central side with respect to two adjacent parts among said plurality of parts;

first operating means for operating an impulse of the subpart motion communicated to the main part under a presumption that the connection point of said subpart to said main part is a fixed point;

first repeating means for repeating, in a recurring manner, the movements of said first specifying means and said first operating means from the terminal side of said movable object to the central side thereof;

second specifying means for specifying a main part on the central side and a subpart on the terminal side with respect to two adjacent parts among said plurality of parts;

second operating means for operating an impulse of the main part motion communicated to the subpart;

second repeating means for repeating, in a recurring manner, the movements of said second specifying means and said second operating means from the central side of said movable object to the terminal side thereof; and artificial intelligence (AI) processing means for executing AI processing incorporating emotions of the movable object that influence and are influenced by at least one of circumstances, evaluation/determination, and factors of behaviors in said virtual three-dimensional space, wherein the AI processing determines an action which is independently associated with the movable object and calculates emotional factors based on the circumstances of said virtual three-dimensional space, wherein the emotional factors control behavior of the movable object.

21. An image generating device for generating images by representing a movable object simulating a person and moving inside a virtual three-dimensional space as a plurality of parts connected via connection points, said image generating device comprising:

first specifying means for specifying a subpart on a terminal side and a main part on a central side with respect to two adjacent parts among said plurality of parts;

first operating means for operating an impulse of the subpart motion communicated to the main part under a presumption that the connection point of said subpart to said main part is a fixed point;

first repeating means for repeating, in a recurring manner, the movements of said first specifying means and said first operating means from the terminal side of said movable object to the central side thereof;

second specifying means for specifying a main part on the central side and a subpart on the terminal side with respect to two adjacent parts among said plurality of parts;

second operating means for operating an impulse of the main part motion communicated to the subpart; and second repeating means for repeating, in a recurring manner, the movements of said second specifying means and said second operating means from the central side of said movable object to the terminal side thereof, wherein at least one of said first and second operating means comprises means for executing seasoning-like operational processing upon simulating said person.

22. An image generating device according to claim 21, wherein said seasoning-like operational processing includes at least one of the operations among:

an operation for applying a reverse moment to at least one part of the plurality of parts, which is caused pursuant to at least one restriction on movement of at least one joint of said person, an operation for reflecting an external force inflicted on said person to at least one part of the plurality of parts, an operation for correcting an unnaturalness of a position of at least one part of the plurality of parts caused pursuant to differences in calculations, an operation for applying an internal force moment caused by at least one physical characteristic of said person to at least one part of the plurality of parts, and an operation for controlling a rotation or movement speed of at least one part of the plurality of parts for reflecting expressions caused by a mentality of said person to said at least one part of the plurality of parts.

23. A storage medium storing a program for executing functions of the first specifying means, first operating means, first repeating means, second specifying means, second operating means and second repeating means of the image generating device of any one of claims 20, 21, 22.

24. An image generating device for generating image data which interpolates motion between two types of motions of a movable object moving within a virtual three-dimensional space, comprising:

operating means for discretely operating a function curve of the motion between said two types of motions pursuant to a current rotational angle, target rotational angle, and a number of frames required to reach the target rotational angle;

interpolation means for performing motion interpolation based on the operational results of said operating means; and artificial intelligence (AI) processing means for executing AI processing incorporating emotions of the movable object that influence and are influenced by at least one of circumstances, evaluation/determination, and factors of behaviors in said virtual three-dimensional space, wherein the AI processing determines an action which is independently associated with the movable object and calculates emotional factors based on the circumstances of said virtual three-dimensional space, wherein emotional factors control behavior of the movable object.

25. A storage medium storing a program for executing functions of the operating means and interpolation means of the image generating device of claim 24.

26. An image generating device for generating images requiring a collision judgment between a movable object moving within a virtual three-dimensional space and a structural object arranged in said space, comprising:

a collision judgment means for judging the collision with said movable object while moving said structural object, wherein a coordinate, being fixed on a collision surface of the structural object while moving, is described in a coordinate system associated with the structural object, and based on said coordinate, the collision is determined; and artificial intelligence (AI) processing means for executing AI processing incorporating emotions of the movable object that influence and are influenced by at least one of circumstances, evaluation/determination, and factors of behaviors in said virtual three-dimensional space, wherein the AI processing determines an action which is independently associated with the movable object and calculates emotional factors based on the circumstances of said virtual three-dimensional space, wherein emotional factors control behavior of the movable object.

27. An image generating device according to claim 26, wherein said collision judgment means is means for judging the collision while moving said structural object in either parallel movement or rotational movement.

28. A storage medium storing a program for executing functions of the collision judgment means of the image generating device of claim 26 or claim 27.

29. A method of moving a viewpoint of a camera on a game display such that an observable body is optimally displayed on the game display, comprising:

determining a current position of the observable body;

determining a current position of a target point, wherein the target point is on a first line extending from a position of the camera and through the target point;

moving the target point a prescribed distance toward the observable body;

calculating an angle between the first line and a line of sight of the camera;

rotating the line of sight of the camera toward the first line based on the angle computed; and executing AI processing incorporating emotions of the observable body that influence and are influenced by at least one of circumstances, evaluation/determination, and factors of behaviors in said virtual three-dimensional space, wherein the AI processing includes determining an action which is independently associated with the observable body and calculates emotional factors based on the circumstances of said virtual three-dimensional space, wherein the emotional factors control behavior of the observable body.

30. A method of moving a viewpoint of a camera on a game display such that an observable body is optimally displayed on the game display, comprising:

determining a first direction from a first position of the camera to a target point;

moving the camera from the first position to a second position;

determining a second direction from the second position of the camera to the target point;

computing an angle between the first direction and the second direction;

rotating a line of sight of the camera based on the angle computed; and executing AI processing incorporating emotions of the observable body that influence and are influenced by at least one of circumstances, evaluation/determination, and factors of behaviors in said virtual three-dimensional space, wherein the AI processing includes determining an action which is independently associated with the observable body and calculates emotional factors based on the circumstances of said virtual three-dimensional space, wherein the emotional factors control behavior of the observable body.

31. A computer-readable medium on which is stored a set of instructions for moving a viewpoint of a camera on a game display such that an observable body is optimally displayed on the game display, which when executed performs steps comprising:

determining a current position of the observable body;

determining a current position of a target point, wherein the target point is on a first line extending from a position of the camera and through the target point;

moving the target point a prescribed distance toward the observable body;

calculating an angle between the first line and a line of sight of the camera;

rotating the line of sight of the camera toward the first line based on the angle computed; and executing AI processing incorporating emotions of the observable body that influence and are influenced by at least one of circumstances, evaluation/determination, and factors of behaviors in said virtual three-dimensional space, wherein the AI processing includes determining an action which is independently associated with the observable body and calculates emotional factors based on the circumstances of said virtual three-dimensional space, wherein the emotional factors control behavior of the observable body.

32. A computer-readable medium on which is stored a set of instructions for moving a viewpoint of a camera on a game display such that an observable body is optimally displayed on the game display, which when executed performs steps comprising:

determining a first direction from a first position of the camera to a target point;

moving the camera from the first position to a second position;

determining a second direction from the second position of the camera to the target point;

computing an angle between the first direction and the second direction;

rotating a line of sight of the camera based on the angle computed; and executing AI processing incorporating emotions of the observable body that influence and are influenced by at least one of circumstances, evaluation/determination, and factors of behaviors in said virtual three-dimensional space, wherein the AI processing includes determining an action which is independently associated with the observable body and calculates emotional factors based on the circumstances of said virtual three-dimensional space, wherein the emotional factors control behavior of the observable body.

33. A system for moving a viewpoint of a camera on a game display such that an observable body is optimally displayed on the game display, comprising:

means for determining a current position of the observable body;

means for determining a current position of a target point, wherein the target point is on a first line extending from a position of the camera and through the target point;

means for moving the target point a prescribed distance toward the observable body;
means for calculating an angle between the first line and a line of sight of the camera;
means for rotating the line of sight of the camera toward the first line based on the angle computed; and
artificial intelligence (AI) processing means for executing AI processing incorporating emotions of the observable body that influence and are influenced by at least one of circumstances, evaluation/determination, and factors of behaviors in said virtual three-dimensional space, wherein the AI processing determines an action which is independently associated with the observable body and calculates emotional factors based on the circumstances of said virtual three-dimensional space, wherein the emotional factors control behavior of the observable body.

34. A system for moving a viewpoint of a camera on a game display such that an observable body is optimally displayed on the game display, comprising:
means for determining a first direction from a first position of the camera to a target point;
means for moving the camera from the first position to a second position;
means for determining a second direction from the second position of the camera to the target point;
means for computing an angle between the first direction and the second direction;
means for rotating a line of sight of the camera based on the angle computed; and
artificial intelligence (AI) processing means for executing AI processing incorporating emotions of the observable body that influence and are influenced by at least one of circumstances, evaluation/determination, and factors of behaviors in said virtual three-dimensional space, wherein the AI processing determines an action which is independently associated with the observable body and calculates emotional factors based on the circumstances of said virtual three-dimensional space, wherein the emotional factors control behavior of the observable body.

35. A method executable by a processor for suggesting to a game player an attack by an enemy, the method comprising:
determining by the processor whether an attack by an enemy has begun or will begin;
computing a bullet path which deviates from a position of the player; and
executing the bullet path until the number of bullets fired in a series by the enemy has reached a predetermined number.

36. The method of claim 35, wherein the bullet path is arc-shaped.

37. The method of claim 35, wherein the deviation between the bullet path and the position of the player decreases as the number of bullets fired in a series increases.

38. A computer-readable medium on which is stored a set of instructions which, when executed by a processor, perform a method for suggesting to a player an attack by an enemy, comprising:
determining by the processor whether an attack by an enemy has begun or will begin;
computing a bullet path which deviates from a position of the player; and
executing the bullet path until the number of bullets fired in a series by the enemy has reached a predetermined number.

39. The computer-readable medium of claim 38, wherein the bullet path is arc-shaped.

40. The computer-readable medium of claim 38, wherein the deviation between the bullet path and the position of the player decreases as the number of bullets fired in a series increases.

41. A system for suggesting to a game player an attack by an enemy:
a processor for executing program instructions;
means for determining by the processor whether an attack by an enemy has begun or will begin;
means for computing a bullet path which deviates from a position of the player; and
means for executing the bullet path until the number of bullets fired in a series by the enemy has reached a predetermined number.

42. The system of claim 41, wherein the bullet path is arc-shaped.

43. The system of claim 41, wherein the deviation between the bullet path and the position of the player decreases as the number of bullets fired in a series increases.

44. A method executable by a processor for controlling at least one character in a game, the method comprising:
determining by the processor an emotion factor of the at least one character based on at least one of a situation or behavior, wherein the emotion factor is determined independently for each character; and
determining by the processor a behavior of the at least one character based on the emotion factor, wherein the behavior is determined independently for each character, such that the behavior can differ between identical sets of situations or identical factors of behavior and the emotion factor controls the behavior of the at least one character.

45. A method executable by a processor for controlling at least one character in a game, the method comprising:
determining by the processor an emotion factor of the at least one character based on at least one of a situation or behavior, wherein the emotion factor is determined independently for each character; and
determining by the processor a behavior of the at least one character based on the emotion factor, wherein the behavior is determined independently for each character,
wherein the emotion factor reflects a degree of anger and fear in the at least one character.

46. The method of claim 45, wherein determining an emotion factor of the at least one character comprises:
changing the emotion factor of the at least one character based on at least one of the following situations: a bullet passes near the at least one character, the at least one character is adversely affected; another character is adversely affected; a performance of the at least one character; and a lapse in time.

47. The method of claim 46, wherein changing the emotion factor of the at least one character comprises at least one of the following:
increasing fear in the at least one character when a bullet passes near the at least one character;
increasing anger in the at least one character when an opposing character defeats a comrade of the at least one character;
increasing fear in the at least one character when an opposing character defeats a comrade of the at least one character;
increasing anger in the at least one character when the at least one character sustains injury;

decreasing anger and fear in the at least one character
when an opposing character sustains injury;
increasing anger rises and decreasing fear in the at least
one character when the at least one character is unable
to inflict injury on an opposing character; and
decreasing anger and fear in the at least one character as
time lapses.

48. The method of claim 45, wherein determining a behavior of the at least one character based on the emotion factor comprises at least one of the following:
increasing a hit rate of the at least one character when fear is low;
decreasing the hit rate of the at least one character when fear is high;
increasing a movement rate of the at least one character when anger is high;
inhibiting the at least one character's shooting when fear is high; and
increasing a shoot rate of the at least one character when anger is high.

49. A computer-readable medium on which is stored a set of instructions for controlling at least one character in a game, which when executed by a processor performs steps comprising:
determining by the processor an emotion factor of the at least one character based on at least one of a situation and behavior, wherein the emotion factor is determined independently for each character; and
determining a behavior of the at least one character based on the emotion factor, wherein the behavior is determined independently for each character, such that the behavior can differ between identical sets of situations or identical factors of behavior and the emotion factor controls the behavior of the at least one character.

50. A computer-readable medium on which is stored a set of instructions which, when executed by a processor, perform a method for controlling at least one character in a game, comprising:
determining by the processor an emotion factor of the at least one character based on at least one of a situation and behavior, wherein the emotion factor is determined independently for each character; and
determining a behavior of the at least one character based on the emotion factor, wherein the behavior is determined independently for each character,
wherein the emotion factor reflects a degree of anger and fear in the at least one character.

51. The computer-readable medium of claim 50, wherein determining an emotion factor of the at least one character comprises:
changing the emotion factor of the at least one character based on at least one of the following situations: a bullet passes near the at least one character, the at least one character is adversely affected; another character is adversely affected; a performance of the at least one character; and a lapse in time.

52. The computer-readable medium of claim 51, wherein changing the emotion factor of the at least one character comprises at least one of the following:
increasing fear in the at least one character when a bullet passes near the at least one character;
increasing anger in the at least one character when an opposing character defeats a comrade of the at least one character;
increasing fear in the at least one character when an opposing character defeats a comrade of the at least one character;
increasing anger in the at least one character when the at least one character sustains injury;
decreasing anger and fear in the at least one character when an opposing character sustains injury;
increasing anger and decreasing fear in the at least one character when the at least one character is unable to inflict injury on an opposing character; and
decreasing anger and fear in the at least one character as time lapses.

53. The computer-readable medium of claim 50, wherein determining a behavior of the at least one character based on the emotion factor comprises at least one of the following:
increasing a hit rate of the at least one character when fear is low;
decreasing the hit rate of the at least one character when fear is high;
increasing a movement rate of the at least one character when anger is high;
inhibiting the at least one character's shooting when fear is high; and
increasing a shoot rate of the at least one character when anger is high.

54. A system for controlling at least one character in a game comprising:
a processor for executing program instructions;
means for determining by the processor an emotion factor of the at least one character based on at least one of a situation and behavior, wherein the emotion factor is determined independently for each character; and
means for determining by the processor a behavior of the at least one character based on the emotion factor, wherein the behavior is determined independently for each character, such that the behavior can differ between identical sets of situations or identical factors of behavior and the emotion factor controls the behavior of the at least one character.

55. A system for controlling at least one character in a game comprising:
a processor for executing program instructions;
means for determining by the processor an emotion factor of the at least one character based on at least one of a situation and behavior, wherein the emotion factor is determined independently for each character; and
means for determining by the processor a behavior of the at least one character based on the emotion factor, wherein the behavior is determined independently for each character,
wherein the emotion factor reflects a degree of anger and fear in the at least one character.

56. The system of claim 55, wherein means for determining an emotion factor of the at least one character comprises:
means for changing the emotion factor of the at least one character based on at least one of the following situations: a bullet passes near the at least one character, the at least one character is adversely affected; another character is adversely affected; a performance of the at least one character; and a lapse in time.

57. The system of claim 56 wherein means for changing the emotion factor of the at least one character comprises at least one of the following:
means for increasing fear in the at least one character when a bullet passes near the at least one character;
means for increasing anger in the at least one character when an opposing character defeats a comrade of the at least one character;

means for increasing fear in the at least one character when an opposing character defeats a comrade of the at least one character;

means for increasing anger in the at least one character when the character sustains injury;

means for decreasing anger and fear in the at least one character when an opposing character sustains injury;

means for increasing anger rises and decreasing fear in the at least one character when the at least one character is unable to inflict injury on an opposing character; and means for decreasing anger and fear in the at least one character as time lapses.

58. The system of claim 55 wherein means for determining the behavior of at least one character based on the emotion factor comprises at least one of the following:

means for increasing a hit rate of the at least one character when fear is low;

means for decreasing the hit rate of the at least one character when fear is high;

means for increasing a movement rate of the at least one character when anger is high;

means for inhibiting the at least one character's shooting when fear is high; and means for increasing a shoot rate of the at least one character when anger is high.

59. A method executable by a processor for controlling at least one character in a game, the method comprising:

determining by the processor an emotion factor of at least one character based on at least one of a situation or behavior and independently for each character, the determining of the emotion factor of the at least one character including:

changing the emotion factor of the at least one character based on at least one of the following situations: a bullet passing near the at least one character, the at least one character being adversely affected; another character being adversely affected; a performance of the at least one character, and a lapse in time, and determining a change in a behavior of the at least one character based on the emotion factor and independently for each character.

60. A computer-readable medium on which is stored a set of instructions which, when executed by a processor, perform a method for controlling at least one character in a game, comprising:

determining by the processor an emotion factor of the at least one character based on at least one of a situation or behavior and wherein the emotion factor is determined independently for each character, the determining of the emotion factor of the at least one character including performing steps of changing the emotion factor of the at least one character based on at least one of the following situations: a bullet passing near the at least one character, the at least one character being adversely affected; another character being adversely affected; a performance of the at least one character; and a lapse in time, and determining a change in a behavior of the at least one character based on the emotion factor and independently for each character.

\* \* \* \* \*